US012807496B2

(12) United States Patent
Bedewy et al.

(10) Patent No.: US 12,807,496 B2
(45) Date of Patent: Nov. 24, 2026

(54) PATTERNING OF NANOCARBON MATERIALS ON A SUBSTRATE

(71) Applicant: University of Pittsburgh—Of the Commonwealth System of Higher Education, Pittsburgh, PA (US)

(72) Inventors: Mostafa Bedewy, McDonald, PA (US); Moataz Magdi Mahmoud Amin Abdulhafez, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 304 days.

(21) Appl. No.: 18/262,439

(22) PCT Filed: Jan. 24, 2022

(86) PCT No.: PCT/US2022/013459
§ 371 (c)(1),
(2) Date: Jul. 21, 2023

(87) PCT Pub. No.: WO2022/159792
PCT Pub. Date: Jul. 28, 2022

(65) Prior Publication Data

US 2024/0083753 A1 Mar. 14, 2024

Related U.S. Application Data

(60) Provisional application No. 63/285,365, filed on Dec. 2, 2021, provisional application No. 63/140,463, filed on Jan. 22, 2021.

(51) Int. Cl.
*C01B 32/184* (2017.01)
*C01B 32/16* (2017.01)
*C01B 32/05* (2017.01)

(52) U.S. Cl.
CPC ............ *C01B 32/184* (2017.08); *C01B 32/16* (2017.08); *C01B 32/05* (2017.08)

(58) Field of Classification Search
CPC ........ C01B 32/05; C01B 32/16; C01B 32/184
See application file for complete search history.

(56) References Cited

U.S. PATENT DOCUMENTS 10,505,193 B2 12/2019 Tour
11,014,816 B2 5/2021 Tour
(Continued)

FOREIGN PATENT DOCUMENTS

WO WO20170223217 A1 12/2017
WO WO2021030300 A4 2/2021
WO WO2022159792 7/2022

OTHER PUBLICATIONS

Lamberti et al. "New insights on laser-induced graphene electrodes for flexible supercapacitors: tunable morphology and physical properties", Nanotechnology, 2017, vol. 28, 174002, p. 1-9 (Year: 2017).*

(Continued)

*Primary Examiner* — Gerard Higgins
(74) *Attorney, Agent, or Firm* — BARTONY & ASSOCIATES LLC

(57) ABSTRACT

A method of producing a carbonized material includes applying a beam of electromagnetic radiation from a laser source to a polymeric substrate, varying the position of the beam to traverse over at least a portion of a surface of the polymeric substrate in a predetermined pattern, and controlling a fluence of the beam and speed of movement of the beam traversing over the at least a portion of the surface of the polymeric substrate as a function of position on the surface to one or more predefined levels of fluence and speed (Continued)

of movement of the beam to control at least one property of the produced carbonized material.

23 Claims, 20 Drawing Sheets

(56) References Cited

U.S. PATENT DOCUMENTS

| | | | |
|---|---|---|---|
| 11,161,744 | B2 | 11/2021 | Tour |
| 2009/0027069 | A1 | 1/2009 | Barrera |
| 2011/0185971 | A1 | 8/2011 | Elliott |
| 2011/0283762 | A1 | 11/2011 | Cheng |
| 2014/0155985 | A1 | 6/2014 | Harrington |
| 2019/0088420 | A1 | 3/2019 | Tour |
| 2020/0002174 | A1 | 1/2020 | Tour |
| 2020/0112026 | A1 | 4/2020 | Tour |
| 2021/0171351 | A1 | 6/2021 | Tour |

OTHER PUBLICATIONS

Mckinley, G. H. Visco-Elasto-Capillary Thinning and Break-up of Complex Fluids. Rheol Rev. 2005, 3 (05), 1-48.

Jones, T. J.; Reynolds, C. D.; Boothroyd, S. C. Fluid Dynamic Induced Break-up during Volcanic Eruptions. Nat. Commun. 2019, 10 (1), 3828. https://doi.org/10.1038/s41467-019-11750-4, 1-48.

Bilger, H. R.; Habib, T. Knife-Edge Scanning of an Astigmatic Gaussian Beam. Appl. Opt. 1985, 24 (5), 686-690.

Lin, Jian et.al., Laser-induced porous graphene films from commercial polymers, Nature Communications, 2014, 5, 1-8.

In, Jung Bin et. al., Facile fabrication of flexible all solid-state micro-supercapacitor by direct laser writing of porous carbon in polyimide, Carbon, 83, (2016), 14-151.

Li, Lei et. al., High-Performance Pseudocapacitive Microsupercapacitors from Laser-Induced Graphene, Adv. Mater. 2016, 28, 838-845.

Luo, Sida et. al., Direct laser writing for creating porous graphitic structures and their use for flexible and highly sensitive sensor and sensor arrays, Carbon 96 (2016), 522-531.

Stanford, M.G. et al., High-Resolution Laser-Induced Graphene. Flexible Electronics beyond the Visible Limit, ACS Appl. Mater. Interfaces 2020, 12, 10902-10907.

Nasser, Jalal, et. al., Laser induced graphene printing of spatially controlled superhydrophobic/ hydrophilic surfaces, Carbon 162 (2020), 570-578.

Luong, Duy Xuan, et. al., Laser-Induced Graphene Composites as Multifunctional Surfaces, ACS Nano 2019, 13, 2579-2586.

Luong, Duy Xuan, et. al., Laser-induced graphene fibers, Carbon 126 (2018), 472-479.

Wang, Rui et. al., Processing-structure-property relationship in direct laser writing carbonization of polyimide, J. Appl. Polym. Sci. 2020, 1-13.

Biswas, Ratul Kumar, et. al., Improved conductivity of carbonized polyimide by CO2 laser graphitization, J. Mater. Chem. C 2020, 8 (13), 4493-4501.

Ruan, Xiaojun et. al., Experimental andmodeling study of CO2 laserwriting induced polyimide carbonization process, Materials and Design 160 (2018) 1168-1177.

* cited by examiner

PATTERNING OF NANOCARBON MATERIALS ON A SUBSTRATE

CROSS-REFERENCE TO RELATED APPLICATIONS

This application is a US national phase filing of PCT international Patent Application No. PCT/US2022/013459, filed Jan. 24, 2022, which claims benefit of U.S. Provisional Patent Application Ser. No. 63/140,463, filed Jan. 22, 2021, and U.S. Provisional Patent Application Ser. No. 63/285,365, filed Dec. 2, 2021, the disclosures of which are incorporated herein by reference.

GOVERNMENTAL INTEREST

This invention was made with government support under grant no, 2028580 awarded by the National Science Foundation. The government has certain rights in this invention.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Laser carbonization of polymers (for example, a polyimide) is an emerging technique that enables directly patterning conductive carbon electrodes for use in, for example, flexible devices, including supercapacitors and sensors. Lasers may be used to locally carbonize commercial polymers, such as polyimide, directly on flexible substrates. The “direct-write” approach of laser carbonization may provide a powerful alternative to printing technologies, which use nanocarbon-containing inks to print conducting electrodes of carbon nanotubes or graphene in flexible device fabrication. While laser-induced nanocarbon (LINC) patterns having a varying porous and fibrous morphologies have been demonstrated, the mechanisms underlying the formation of specific LINC morphologies are largely undetermined. An important challenge thus remains in determining the process-structure-property relationships for LINC formation to enable improved control of laser carbonization of polymers.

SUMMARY

In one aspect, a method of producing a carbonized material includes applying a beam of electromagnetic radiation from a laser source to a polymeric substrate, varying the position of the beam to traverse over at least a portion of a surface of the polymeric substrate in a predetermined pattern, and controlling a fluence of the beam and speed of movement of the beam traversing over the at least a portion of the surface of the polymeric substrate as a function of position on the surface to one or more predefined levels of fluence and speed of movement of the beam to control at least one property of the produced carbonized material. Change in at least one of fluence as speed as well as a rate of change thereof may be independently controlled over a path of lasing. The fluence of the beam and speed of movement of the beam are controlled in a number of embodiments to the one or more predefined levels of fluence and speed of movement of the beam to achieve one or more predetermined transitions in the at least one property of the carbonized material at one or more predetermined positions on the surface of the polymeric substrate along a path of lasing. The one or more predetermined transitions in the at least one property of the carbonized material may include at least one of a transition in chemical composition, a transition in carbon atomic structure, or a transition in morphology. In a number of embodiments, the transition in chemical composition includes or is a transition in heteroatom content. In a number of embodiments, the transition in carbon atomic structure is or includes a transition to $sp^2$-hybridized graphitic carbon. The produced carbonized material may be rich in graphene domains. Such graphene domains may be nanostructured graphene domains (for example, exhibiting porosity, anisotropic porosity, or a nanofiber structure or morphology).

The one or more predetermined transitions may be smooth transitions. Such transitions or gradients in one or more properties on a single substrate may be created via one or more gradients in fluence and/or speed along a path of lasing.

In a number of embodiments, the fluence of the beam is controlled to the one or more predefined levels of fluence by controlling a distance between a focus or waist of the beam and the surface of the polymeric substrate, by controlling optics of the laser source or by controlling power of the laser source. The fluence of the beam in a number of embodiments is controlled to the one or more predefined levels of fluence by controlling a distance between a focus or waist of the beam and the surface of the polymeric substrate. The distance between a focus or waist of the beam and the surface of the polymeric substrate may, for example, be controlled by a static variation in surface conformation of the polymeric substrate, by dynamically changing the position of the laser source during lasing, by dynamically changing the position of the polymeric substrate during lasing, or by combinations thereof. At least one of fluence of the beam or the speed, of movement of the beam may be varied over the at least a portion of the surface of the polymeric substrate. At least one of fluence of the beam or the speed of movement of the beam may be held constant over the at least a portion of the surface of the polymeric substrate.

In a number of embodiments the one or more predetermined transitions in the at least one property of the carbonized material includes a one or more transitions in morphology. One or more thresholds levels of fluence for a given speed of movement of the beam associated with the one or more predetermined transitions may, for example, include a lower threshold corresponding to a transition from an isotropic porous morphology to an anisotropic cellular network and a higher threshold corresponding to (i) a transition from an anisotropic cellular network to aligned nanofibers or (ii) to a transition from an anisotropic cellular network to a porous ablated morphology. The fluence of the beam may be controlled over an area of the substrate to which the beam of electromagnetic radiation is applied to be between the lower threshold and the higher threshold to provide electrical conductivity over at least a portion of the area of the surface of the polymeric substrate.

In a number of embodiments, the method further includes creating a model of properties of the produced carbonize material as a function of at least one of (i) the speed of movement of the beam or (ii) the fluence of the beam or a variable upon which the fluence of the beam is dependent. The model of properties may also be determined as a function of beam focus and power input to the laser source.

In a number of embodiments, the one or more predetermined transitions (including fluence and/or speed associated therewith) are determined by traversing the laser source over at least one test polymeric substrate of the same polymeric material as the polymeric substrate which is inclined in orientation relative to the path of the laser source to create a continuous variation in fluence over the path of the laser source. Ln a number of embodiments, the one or more predetermined transitions are determined by traversing the laser source over at least one test polymeric substrate of the same polymeric material as the polymeric substrate which is inclined in orientation relative to the path of the laser source to create a continuous variation in fluence over the path of the laser source.

In another aspect, a system for producing a carbonized material includes a laser source configured to apply a beam of electromagnetic radiation from the laser source to a polymeric substrate, and a control system configured to vary the position of the beam to traverse over at least a portion of a surface of the polymeric substrate in a predetermined pattern and to control a fluence of the beam and speed of movement of the beam traversing over the at least a portion of the surface of the polymeric substrate as a function of position on the surface to one or more predefined levels of fluence and speed of movement of the beam to control at least one property of the produced carbonized material. In a number of embodiments, the control system is configured to control, the fluence of the beam and the speed of movement of the beam to the one or more predefined levels of fluence and speed of movement of the beam to achieve one or more predetermined transitions in the at least one property of the carbonized material at one or more predetermined positions on the surface of the polymeric substrate along a path of lasing.

As described above, the one or more predetermined transitions in the at least one property of the carbonized material may include at least one of a transition in chemical composition, a transition in carbon atomic structure, or a transition in morphology. In a number of embodiments, the transition in chemical composition includes or is a transition in heteroatom content. In a number of embodiments, the transition in carbon atomic structure is or includes a transition to $sp^2$-hybridized graphitic carbon. The produced carbonized material may be rich in graphene domains. Such graphene domains may be nanostructured graphene domains (for example, exhibiting porosity, anisotropic porosity, or a nanofiber structure or morphology).

The one or more predetermined transitions may be smooth transitions. Such transitions or gradients in one or more properties on a single substrate may be created via one or more gradients in fluence along a path of lasing.

In a number of embodiments, the control system is configured to control the fluence of the beam to the one or more predefined levels of fluence by controlling a distance between a focus or waist of the beam and a surface of the polymeric substrate, by controlling optics of the laser source, by controlling power of the laser source, or by combinations thereof. The control system is configured in a number of embodiments to control the fluence of the beam to the one or more predefined levels of fluence by controlling a distance between a focus or waist of the beam and a surface of the polymeric substrate. The distance between a focus or waist of the beam and the surface of the polymeric substrate may be controlled by a static variation in surface conformation of the polymeric substrate, by dynamically changing the position of the laser source during lasing, or by dynamically changing the position of the polymeric substrate during lasing.

The control system may be configured to vary at least one of fluence of the beam or the speed of movement of the beam over the at least a portion of the surface of the polymeric substrate. The control system may be configured to hold constant at least one of fluence of the beam or the speed of movement of the beam over the at least a portion of the surface of the polymeric substrate.

As described above, the one or more predetermined transitions in the at least one property of the carbonized material may include a one or more transitions in morphology. The one or more thresholds levels of fluence for a given speed of movement of the beam associated with the one or more predetermined transitions may, for example, include a lower threshold corresponding to a transition from an isotropic porous morphology to an anisotropic cellular network and a higher threshold corresponding to (i) a transition from an anisotropic cellular network to aligned nanofibers or (ii) to a transition from an anisotropic cellular network to a porous ablated morphology. The fluence of the beam may be controlled over an area of the substrate to which the beam of electromagnetic radiation is applied to be between the lower threshold and the higher threshold to provide electrical conductivity over at least a portion of the area of the surface of the polymeric substrate.

In a number of embodiments, the control system includes a processor system and a memory system in communicative connection with the processor system. The memory system includes an algorithm to control movement of the laser source. The memory system may further include a model of properties of the produced carbonize material as a function of at least one of (i) the speed of movement of the beam or (ii) the fluence of the beam or a variable upon which the fluence of the beam is dependent. The model of properties of the carbonized material may also be determined as a function of the beam focus and power input to the laser source.

In a number of embodiments, the one or more predetermined transitions (and associated fluence and/or speed) are determined by traversing the laser source over at least one test polymeric substrate of the same polymeric material as the polymeric substrate which is inclined in orientation relative to the path of the laser source to create a continuous variation in fluence over the path of the laser source. The one or more predetermined transitions may be determined by traversing the laser source over at least one test polymeric substrate of the same polymeric material as the polymeric substrate which is inclined in orientation relative to the path of the laser source to create a continuous variation in fluence over the path of the laser source.

In another aspect, a composition includes a carbonized material formed by a process as described herein. In that regard, the carbonized material is formed by applying a beam of electromagnetic radiation from a laser source to a polymeric substrate, varying the position of the beam to traverse over at least a portion of a surface of the polymeric substrate in a predetermined pattern, and controlling a fluence of the beam and speed of movement of the beam traversing over the at least a portion of the surface of the polymeric substrate as a function of position on the surface to one or more predefined levels of fluence and speed of movement of the beam to control at least one property of the carbonized material.

In a further aspect, devices include a composition hereof. Such devices may utilize properties of the compositions hereof such as electronic properties and/or physiochemical properties thereof. In a number of embodiments, such devices are electronic devices.

In still a further aspect, a composition includes a substrate including a path of laser-carbonized material wherein the path comprises a gradient in at least one property of the carbonized material along the path. In a number of embodiment, the path includes at least one of a gradient in chemical composition, a gradient in carbon atomic structure, or a gradient in morphology along the path. The gradient in chemical composition may include or be a gradient in heteroatom content. The carbonized material may include domains rich in graphene such as nanostruetured graphene.

The path may, for example, include at least one of a transition or gradient in morphology. For example, the path may include a transition to a porous morphology. In a number of embodiment, the transition in morphology includes a transition from an isotropic porous morphology to an anisotropic cellular network, a transition from an anisotropic cellular network to aligned nanofibers or a transition from an anisotropic cellular network to a porous ablated morphology.

The path of laser-carbonized material may be created via traversing of a beam of electromagnetic energy over at least a portion of a polymeric precursor substrate and controlling the fluence and speed of movement of the beam of electromagnetic energy along the path.

The present devices, systems, methods and compositions], along with the attributes and attendant advantages thereof, will best be appreciated and understood in view of the following detailed description taken in conjunction with the accompanying drawings.

DESCRIPTION

Figure 1:
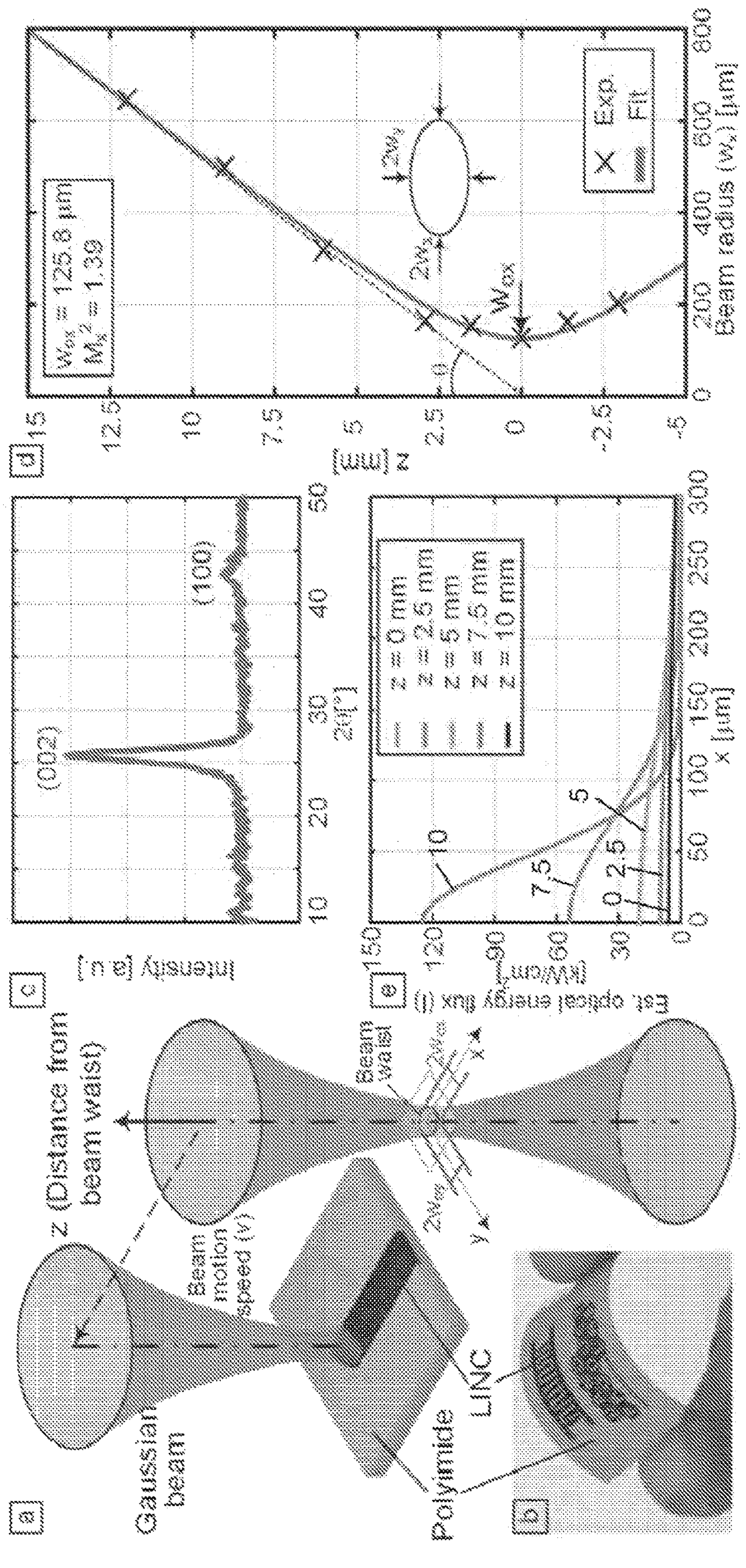
FIG. 1 illustrates: (a) Schematic of lasing flat untilted polyimide to produce a LINC line with a Gaussian beam (reverenced herein as FIG. 1*a*). (b) Photograph of a 2D LINC pattern on a flexible polyimide substrate. (c) XRD of powdered LINC lased at P=28 W, v=500 mm/s, z 0 mm), (d) Experimental points representing the estimated laser beam profile along the lasing direction x using the knife edge technique, along with the profile of the fitted Gaussian beam illustrating the divergence of the beam away from the beam waist. The resulting beam spot in the x direction is estimated to be $2_{ow}$=251.6 μm. (e) Estimated optical flux along the x direction at constant power (P=22.5 W), showing the change of beam intensity with z (i.e. with changing spot size by defocusing the beam), (f) Plot illustrating the change in dwell time with speed and spot size. (g) Plot of estimated average fluence with changing spot size and power for lasing tilted at ψ=45°, wherein the axis represents the equivalent z values to x'.
Figure 1:
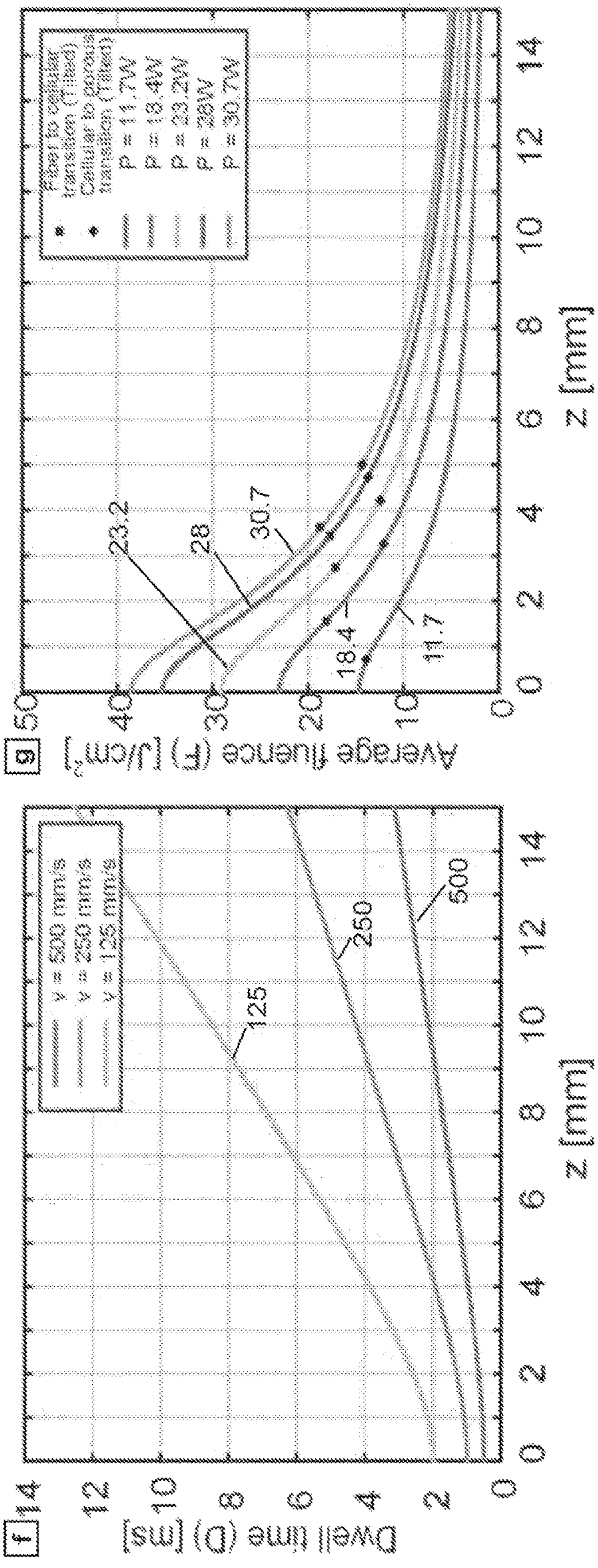

The present devices, systems, methods and compositions, along with the attributes and attendant advantages thereof, will best be appreciated and understood in view of the following description taken in conjunction with any accompanying drawings.

It will be readily understood that the components of embodiments hereof, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etcetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a laser source" includes a plurality of such laser sources and equivalents thereof known to those skilled in the art, and so forth, and reference to "the laser source" is a reference to one or more such laser sources and equivalents thereof known to those skilled in the art, and so forth. Recitation oranges of values herein are merely intended to serve as a shorthand method of referring individually to each separate value falling within the range. Unless otherwise indicated herein, and each separate value as well as intermediate ranges are incorporated into the specification as if it were individually recited herein. All methods described herein can be performed in any suitable order unless otherwise indicated herein or otherwise clearly contraindicated by the text.

Determining, mapping, or modeling of laser conditions that lead to differences in physiochemical quantities or characteristics has largely yet to be accomplished in LINC grown on polymeric materials but is important in achieving controlled and repeatable INC to produce patters of predetermined properties, including, for example, morphological, chemical, and/or electrical properties. For example, it is desirable to identify transitional levels, values or thresholds in processing parameters resulting in changes in morphologies and/or other properties.

In a number of embodiments, devices, systems, and methods hereof provide an unprecedented capability to create compositions including patterns of graphene-based nanocarbon materials including nanofibers, branched networks and other nanoporous morphologies with spatial control of their morphology and properties through laser carbonization of substrate polymers. Many different polymers may be used in the devices, systems, and method hereof. A number of such polymers and other precursor materials, lasers suitable for use in connection therewith, and a general description of laser induced carbonization to form various graphene-based materials (that is, materials including graphene-rich domains), and a number of conditions for carbonization are, for example, summarized in U.S. Patent Nos. 10,505,193, 11,014,816, 11,161,744, and U.S. Patent Application Publication Nos. 2019/0088420 A1 and 2020/0112026A1, the disclosures of which are incorporated herein by reference.

The laser induced formation of nanocarbons is a superior alternative to top-down printing methods that are typically employed in fabricating flexible devices with functional nanocarbon materials. As opposed to the case of printing from ink or transfer printing methods, which require creating new inks for each type of nanocarbon to be printed, the devices, systems and method hereof can directly create different types of nanocarbons on different locations of the same surface easily by spatial control of laser fluence and speed of movement of the laser source.

It is important to understand the process-structure-property relationships for LINC formation. In that regard, to control LINC morphology, it is important to determine the laser condition (including, for example, wavelength, power, speed, pulse rate, etc.) that may be used to achieve a desired LINC morphology. Likewise, it is important to determine the manner in which morphology and chemical composition of LINCs affect their properties (for example, electrical conductivity, electrochemical behavior, etc.).

LINC is shown to be an attractive method to fabricate porous conductive electrodes directly on flexible substrates, which are required for a wide range of applications. As described above, as an alternative to printing technologies from nanocarbon inks, LINC formation is more scalable and less costly. Taken together, the results of studied hereof show that material properties such as resistivity can be tuned through morphology adjustment based on local control of laser fluence and speed of movement of the laser source. Accordingly, the variety of LINC morphologies achieved and the tunability of their properties make them superior to printing techniques that require the preparation of different nanocarbon inks for writing carbon-based electrodes with different morphologies and molecular structures on flexible substrates. Moreover the ability to control the spatial variation of morphologies and properties on the same substrate can be particularly useful in designing LINC for applications integrating high surface area nanocarbon electrodes with highly conductive and dense traces, such as for electrochemical applications.

In a number of embodiments, fluence and/or speed of the beam of electromagnetic radiation is varied over the pattern to create a transition in properties (for example, from one morphology to another). The fluence and/or speed of the beam (to, for example, create a spatial gradient therein) may be varied over the pattern to create a smooth transition or gradient in properties along the path of lasing as the beam traverses over the surface of the substrate. As used herein, the term "smooth transition" refers to a transition or gradient, without an abrupt change, from a carbonized material of one property (for example, morphology) to an adjacent carbonized material of another, different property (for example, morphology etc.). Such transitions are mechanically robust transitions without gaps or discontinuities between carbonized materials of adjacent, different properties (that is, for example, a continuous morphing from one morphology and an adjacent morphology). Such smooth transitions eliminate the need to create interfaces between, for example, one morphology and an adjacent morphology.

One or more models of one or more properties (for example, morphological, chemical, atomic structural, electrical and/or other properties, which may be interrelated) may be created as a function of the fluence (or of a variable upon which the fluence is dependent) and/or speed. In a number of embodiments, the model of a property such as morphology is determined as a function of beam focus (or a variable upon which fluence is dependent) and power input to the laser source as well as speed. Predetermined levels or thresholds of fluence and speed as well as models based thereon may, for example, be readily determined as described herein for a particular laser source, a particular wavelength of electromagnetic energy, a particular power input, a particular material, etc.

In a number of studies hereof (see FIGS. 1 through 8) using $CO_2$ laser irradiation, laser-induced carbonization processes were studied wherein gradients of laser fluence were achieved by controlling the spatial map of vertical coordinates (Z-axis; the distance of the surface from the focus or waist of the laser beam) for points on the sample surface at constant laser speed (500 mm/s). Studies in which the speed of the translation of the laser source over the polymeric substrate are set forth in FIGS. 9 through 18. The same fluence value delivered at different values of speed can vary significantly in terms of temperature and temperature change with time, which can greatly affect the resulting morphology and carbonization.

Studies hereof at a constant laser speed of, for example, 500 mm/s, illustrate methods, devices, and systems for lasing polymer films using representative polyimide films with spatially controlled gradients of optical energy flux. Combined with Gaussian beam modeling, the methods, devices, and systems hereof uniquely enable continuously sweeping different laser fluence values as a spatial map along the laser path. $CO_2$ laser irradiation of the representative polymer polyimide demonstrated the direct formation of a variety of nanocarbons ranging from isotropic porous carbon, highly anisotropic cellular networks of graphitic carbon, and aligned carbon nanofibers. A fluence-based approach was developed to elucidate the process-structure-property relationships governing LINC formation for these morphologies. This is achieved by mathematically modeling the effect of degree of defocus on intensity distribution and fluence for a Gaussian laser beam. A methodology for creating fluence gradients on tilted polyimide films is also described. Importantly, two specific threshold values of fluence were identified as follows: the transition from isotropic porous morphology to anisotropic cellular networks (T1) at a fluence value of 12 J/$cm^2$; second, the transition to aligned woolly nanofibers (T2) at a fluence value of 17 J/$cm^2$. Moreover, anisotropic cellular networks were shown to have the highest electrical conductivity (≈5 S/cm) for the conditions studied (laser wavelength of 10.6 μm and scanning speed of 500 mm/s), due to the lateral connectivity and the high graphitic content. Hence, the models and results hereof provide insights into the physicochemical processes underlying LINC formation and enable generating a morphology diagram of laser processing parameters. Once again, anisotropic cellular networks are the most electrically conducting and have the highest quality $sp^2$ carbon. On the other hand, the aligned woolly nanofiber morphology is electrically insulating along the length of the lased lines, although the woolly nanofiber morphology exhibits the highest degree of carbonization with the least heteroatom content. Such results provide new insights into the fluence-dependence of the physicochemical processes underlying LINC formation. Moreover, the methodology hereof enables generating a morphology diagram for LINC, which facilitates precise tunability of both the morphology and properties of LINC patterns, based on easy-to-control processing parameters, such as laser power and degree of beam defocusing.

A mapping of Z-values may, for example, be achieved by tilting a flat sample for monotonous fluence gradients, by designed surface topography that is machined (or otherwise formed to vary over the surface) before the laser carbonization process, by controlling the position of the laser source or by controlling the optics of the laser source which focus the beam. Fluence may also be controlled by altering power such as though pulse width modulation. The devises, systems, and methods hereof are capable of creating a variety of nanocarbons directly on, for example, the surface of a single flexible polymer film or substrate, such as a representative polyimide substrate, which makes such devices, systems, and methods attractive in, for example, functional flexible device manufacturing. The reason that changing Z-coordinate of the substrate surface enables creating spatial maps of laser fluence is that changing Z-values leads to control ling the degree of beam focus/defocus, which in turn controls the average fluence value on each point on the surface. As described above, control of focus/defocus may also be achieved optically. Hence, as the laser is rastered or scanned over a surface with spatially varying Z-coordinate, a spatially varying fluence map is generated, which enables creating fluence-dependent nanocarbon morphologies locally at each point of the surface. This ability to engineer spatial variations of morphology enables creating highly conducting traces of dense graphitic carbon that seamlessly morph into a high surface area nanoporous carbon for electrochemical electrodes, for example. Hence, the present methods, devices and systems can facilitate the fabrication of different types of flexible devices such as sensors, capacitors, and others.

Further insights into the fundamental mechanisms underlying the formation of LINC morphologies were gained in studies of lasing speed. In such studies, the approach of lasing individual electrodes on a tilted polyimide sheet as described above was used to allow scanning a continuum of laser fluence on the sample. Once again, such an approach is valuable for revealing discrete morphological transitions and mapping structural and chemical changes as a function of fluence. To investigate if morphological and structural transitions are energetically or kinetically driven, lines were lased at a fixed power and different speeds and the fluence values that drive these transitions were identified at the different speeds. In addition to the porous-to-cellular-networks and the cellular-network-to-woolly-fiber morphological transitions described above, a new ablation threshold was identified that occurs at low speeds (that is, v<300 mm/s under the conditions studied). This transition is characterized by ablation of the top surface and a hierarchical porosity with improved graphitization (D/G ratio of 0.64). Additionally, it was demonstrated that the fluence at which fibers form is highly speed dependent and that fibers form only at high speeds for the polyimide material studied (v>300 mm/s), in contrast with the other two transitions. For more in depth analysis, a methodology hereof was developed which integrates the experimental values with thermal finite element method (FEM) simulations of the tilted lasing. By logging the temperatures and temperature rates at the locations of the transitions, it was determined that the porous to cellular transition and the ablation transitions occur at a temperature around 3000° C. and 3100° C. respectively, which match temperatures of reported for polyimide graphitization and ablation of graphitic material. The determinations were further supported by Raman spectroscopy analysis which confirmed that graphitization occurs at the porous-to-cellular morphology transition with the appearance of the 2D peak and a marked drop in electrode resistivity. Additionally, the analysis revealed that the fiber formation transition occurs at temperature increase rate of ≈$10^{7}$° C./s. Without limitation to any mechanism, the fiber formation phenomenon may be due to the jetting of incompletely carbonized viscoelastic polymer (polyimide) as a result of the high rate of temperature increase and gas release. Such results provide insights into the kinetics of the physicochemical processes underlying LINC formation and may be used in tailoring LINC material for various applications.

Constant Speed Studies.

In a number of constant speed (v=500 minis) studies hereof, laser fluence gradients and beam defocus were leveraged to facilitate understanding LINC formation process by quantitatively correlating laser condition, the resulting LINC morphologies, and their varying physiochemical properties (for example, electrical conductivity). Additionally, methods, devices, and system of creating LINC materials with spatially varying morphologies and hence spatially varying properties are set forth. Toe investigate the effect of tuning fluence on morphology and properties, mathematical modeling of Gaussian laser beams was uniquely combined with two experimental approaches to control the local spread of the beam: 1) lasing individual lines on a tilted polyimide surface to achieve controlled gradients of fluence, and 2) lasing untilted samples at different degrees of defocusing for spatially uniform LINC lines. The first approach enables studying the evolution of nanoscale morphology and atomic structure continuously at different fluence values on the same polyimide film. Thus, one may precisely identify fluence thresholds for transition between different LINC morphologies owing to the resulting spatial map of fluence along a single LINC line in the tilted experiments. Based results of studies hereof, a model was developed for morphological evolution during laser carbonization that results in nanoporous structures, cellular networks, and woolly fibers at different fluence values, which enables delineating a clear morphology diagram. The results were correlated with electrical conductivity measurements to reveal the process-structure-property relationships governing the design of LINC materials with tunable and spatially varying properties.

LINCs form as a result of the local interaction of a laser beam with the surface of polyimide. As shown schematically in FIG. 1(*a*), a continuous beam with power P is scanned across a polymeric file (a polyimide film in representative examples hereof) at a speed v with the sample surface at a distance z from the beam waist. Photothermal interactions from the radiation absorption by the polyimide drive a rapid temperature increase that carbonizes polyimide locally at the moving laser spot to create a pattern, as depicted in FIG. 1(*b*). Depending on the lasing parameters, the polyimide can be carbonized into nanoscale graphene-rich domains (domains including graphene nanostructure), as shown from X-ray diffraction (XRD) results in FIG. 1(*c*). The illustrated results were generated for individual LINC lines, which are formed at power P=28 W, speed v=500 mm/s, and distance from beam waist z=0 mm. From XRD, one can clearly identify the (002) and (100) peaks that are characteristic of highly ordered $sp^2$-hybridized graphitic carbon.

The laser beam profile of the CW $CO_2$ laser used in the above-described study is depicted in FIG. 1(*d*), estimated from beam characterization experiments (described in the Experimental Examples below), (CW $CO_2$ lasers were used for LANC applications hereof primarily because polyimide has high absorptivity for the infrared. (IR) range around the wavelength of $CO_2$ laser (A=10.6 μm) and hence carbonizes relatively easily. Moreover, $CO_2$ laser systems are commercially available at low cost, which paves the way for widespread adoption of the approach hereof for fabrication of functional electrodes on flexible devices. Beam power and profile measurements are used to estimate the laser intensity profile at the different z values at different spot sizes and powers. An example is shown in FIG. 1(*e*) which shows the change of intensity across the beam for different z values at the same laser power. At different z values the beam intensity I(x,y) follows a Gaussian distribution with the narrowest distribution featuring the overall maximum value of intensity at the beam waist where z=0 mm. Changing both the speed and the spot size changes the dwell time of the laser spot, which corresponds to how long a point is exposed to the moving laser beam. Increasing speed reduces the dwell time. At a fixed speed, however, the dwell time also decreases with decreasing spot size as shown in the FIG. 1(*f*). The relationship between the beam dwell, time and laser intensity controls the value of the average fluence (estimated using the Gaussian beam model), which would in turn influence the temperature increase at a point as discussed in the Methods section. The change in average fluence delivered at different degrees of beam defocusing (i.e. different a values) and powers is shown in FIG. 1(*g*).

Figure 2:
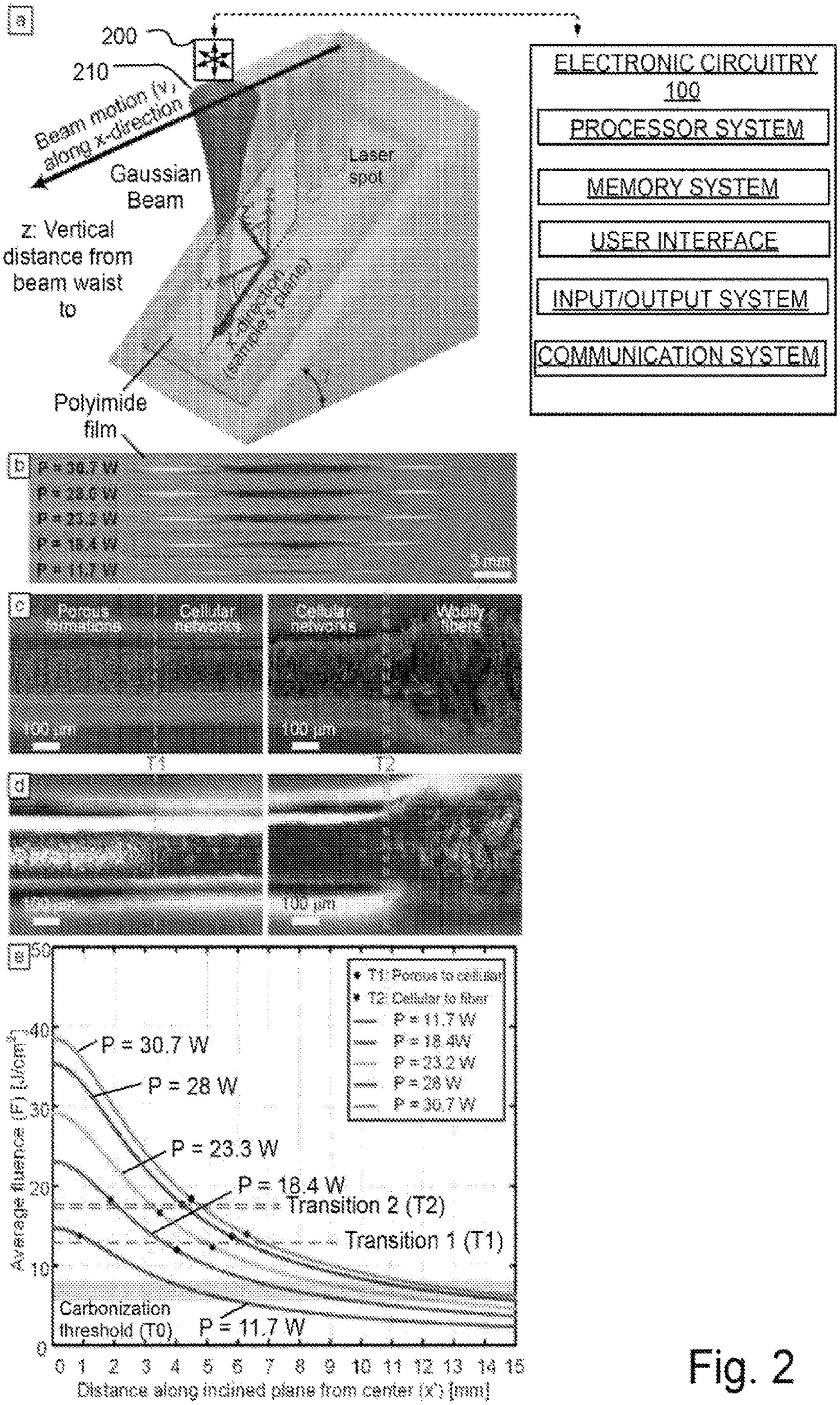
FIG. 2 illustrates: (a) Schematic of setup for LINC formed with gradient fluence by lasing tilted polyimide at an angle ψ. The lines are lased along the x' in the sample's plane, while the beam moves along x direction with speed v. (b) Optical photograph of the different lines lased at different powers using the method described in (a) at ψ=45° showing the different color/morphology changes along the lased lines and the change of the location of the transition of LINC morphology as a function of powers. (c) SEM image of the two transitions from porous to cellular networks (T) and from cellular networks to woolly fibers (T2) lased at power P=18.4 W. (d) Optical microscopy images at the same points showing the change in line reflectivity for both transitions and abrupt formation of woolly fibers. e) Plot of estimated fluence delivered at different powers and v=500 m/ins vs. the distance from LINC line center in the x' direction. Locations of transitions T1 and T2 are marked with black diamond and square markers on the curves, respectively, showing that the transitions occur at similar fluence values around $F_{T1}$=42 J/cm$^2$ and $F_{T2}$=17 J/cm$^2$ (horizontal red lines of constant fluence). Horizontal grey hand 5-8 J/cm$^2$ represents the estimated carbonization threshold.

As described above, to investigate the influence of beam intensity and fluence on polyimide carbonization, a gradient of fluence was created by lasing a tilted sample of polyimide. The tilt angle controls how different points on the substrate along the laser path experience different fluence levels. A schematic of the system used in experiments hereof is shown in FIG. 2(*a*), where the sample is lased at an angle (γ=45°). While the laser beam moves in a horizontal direction x at a speed v, the sample is tilted along the x' direction with angle γ between x and x'. Since the spot size changes with z, the beam maximum intensity, average fluence and dwell time also change along the x' direction (that is, along the lased lines in the sample's plane). Tilting the axis normal to the sample (Z') with respect to the beam axis (Z) by γ changes the distribution of beam intensity and transforms the geometry of the beam spot. It was demonstrate that the average fluence value for the untilted case is approximately equal to the tilted case for the values of beam parameters hereof. This result can be explained by the fact that the tilt angle doesn't drastically change the laser beam intensity profile, and that while the beam broadens, so does the beam spot. Hence, averaging over the area doesn't affect the averaged intensity over the spot when comparing the untilted to the tilted case.

Those skilled in the art will appreciate that electronic circuitry 100 of devices and systems hereof (whether tilted or untilted, and represented schematically by the arrows corresponding to beam motion in FIG. 2(*a*) hereof) may include, for example, a processor system in operative connection with a memory system. The memory system may include software including one or more algorithms (or models) stored in memory system and executable by the processor system to operate as a control system or controller to independently control parameters of the laser source and/or a motion systems hereof via a movable frame 200 in operative connection with the laser source 210 to provide control of the movement of laser source 210 in three dimensions (as, for example, practiced in the robotics arts). The processor system (which may, for example, include one or more processors and/or microprocessors) of the electronic circuitry may execute software stored in the memory system including one or more models/algorithms that implement one or more algorithms or sub-algorithms. As known in the computer arts, an input/output system and/or user interface system may be in operative connection with the processor system and the memory system to, for example, acquire data input from one or more users and/or a sensor system and to output data/information. A communication system can be provided for transmission and/or reception of information/data. Although software algorithms hereof may be executed via electronic circuitry of a device or system hereof, one skilled in the art appreciates that such algorithms may, for example, be stored and executed separately (for example, in a separate computer) or that storage of such algorithms and execution thereof may be distributed over a number of devices or systems.

The terms "electronic circuitry", "circuitry" or "circuit," as used herein include, but are not limited to, hardware, firmware, software, or combinations of each to perform a function(s) or an action(s). For example, based on a desired feature or need, a circuit may include a software-controlled microprocessor, discrete logic such as an application specific integrated circuit (ASIC), or other programmed logic device. A circuit may also be fully embodied as software. As used herein, "circuit" is considered synonymous with "logic." The term "logic", as used herein includes, but is not limited to, hardware, firmware, software, or combinations of each to perform a function(s) or an action(s), or to cause a function or action from another component. For example, based on a desired application or need, logic may include a software-controlled microprocessor, discrete logic such as an application specific integrated circuit (ASIC), or other programmed logic device. Logic may also be fully embodied as software.

The term "processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random-access memory (RAM), read-only memory (ROM), programmable read-only memory (PROM), erasable programmable read only memory (EPROM), clocks, decoders, memory controllers, or interrupt controllers, etc., These support circuits may be internal or external to the processor or its associated electronic packaging. The support circuits are in operative communication with the processor. The support circuits are not necessarily shown separate from the processor in block diagrams or other drawings.

The term "controller," as used herein includes, but is not limited to, any circuit or device that coordinates and controls the operation of one or more input and/or output devices. A controller may, for example, include a device having one or more processors, microprocessors, or central processing units capable of being programmed to perform functions.

The term "software," as used herein includes, but is not limited to, one or more computer readable or executable instructions that cause a computer or other electronic device to perform functions, actions, or behave in a desired manner. The instructions may be embodied in various forms such as routines, algorithms, modules, or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

The samples hereof were lased at different powers ranging from P=11.7 W to P=30.7 W at a constant beam scanning velocity v=500 mm/s with the resulting lased lines shown in FIG. 2(*b*). Because each point on the line represents a different average fluence value, the lines with gradient fluence uniquely enables mapping the fluence-dependent morphological evolution. Close to the edges of the visible lines, swelling of the polyimide is observed. Towards the center of the lines, carbonization is visible, and in some cases the formation of fuzzy/woolly fibers at the center was observed where fluence is highest. The length of the carbonized portion of the line where LINC is formed (black portion) increases with increasing P, which can be explained by shifts in the location, at which the threshold fluence for carbonization (estimated to be in the range of 5-8 J/cm$^2$) is reached, referred to here as transition T0.

More discrete transitions of LINC morphology along the lines are identified under both optical microscopy and scanning electron microscopy (SEM) imaging, as shown in FIGS. 2(*c*) and 2(*d*). The first type of transition (T1) observed is from a porous morphology to a cellular network morphology, which is accompanied by a stark change in reflectivity as shown in the optical images of FIG. 2(*d*). The second type of transition. (T2) observed is an abrupt transition from the cellular networks to a large volume woolly fibrous formation. This second transition was only observed at powers larger than P=18.4 W. The distance between the midpoint of the lines and the points of transition along the x' direction are plotted in FIG. 2(*e*). The transitions (T1 and T2) are mapped with the average fluence estimated at the different powers and x' values according to the beam model presented in the Experimental Methods section hereof. The plot indicates that the transitions occur at fixed average fluence values, which is a useful insight that may be used in creating a morphology diagram. The porous formation to cellular formation transition (T1 in FIG. 2(*e*)) occurs at an estimated average fluence value of ≈12 J/cm$^2$. The transition from cellular network to wooly fiber formations occurs at an estimated average fluence value of around ≈17 J/cm$^2$. It is also observed that while, there is a porous to cellular network transition (T1) when the lasing power was P=11.7 W, there is no network to fibers transition (T2) at this low power. This result indicates that the fluence threshold for woolly fiber formation is higher than peak fluence in the center of the line at this power, which highlights the utility of the fluence-based mapping approach and beam modeling hereof. In addition to the fluence driven transitions, the resulting woolly fibers at the point of highest fluence (center of the lines) become more voluminous and wider with increasing power.

Figure 3:
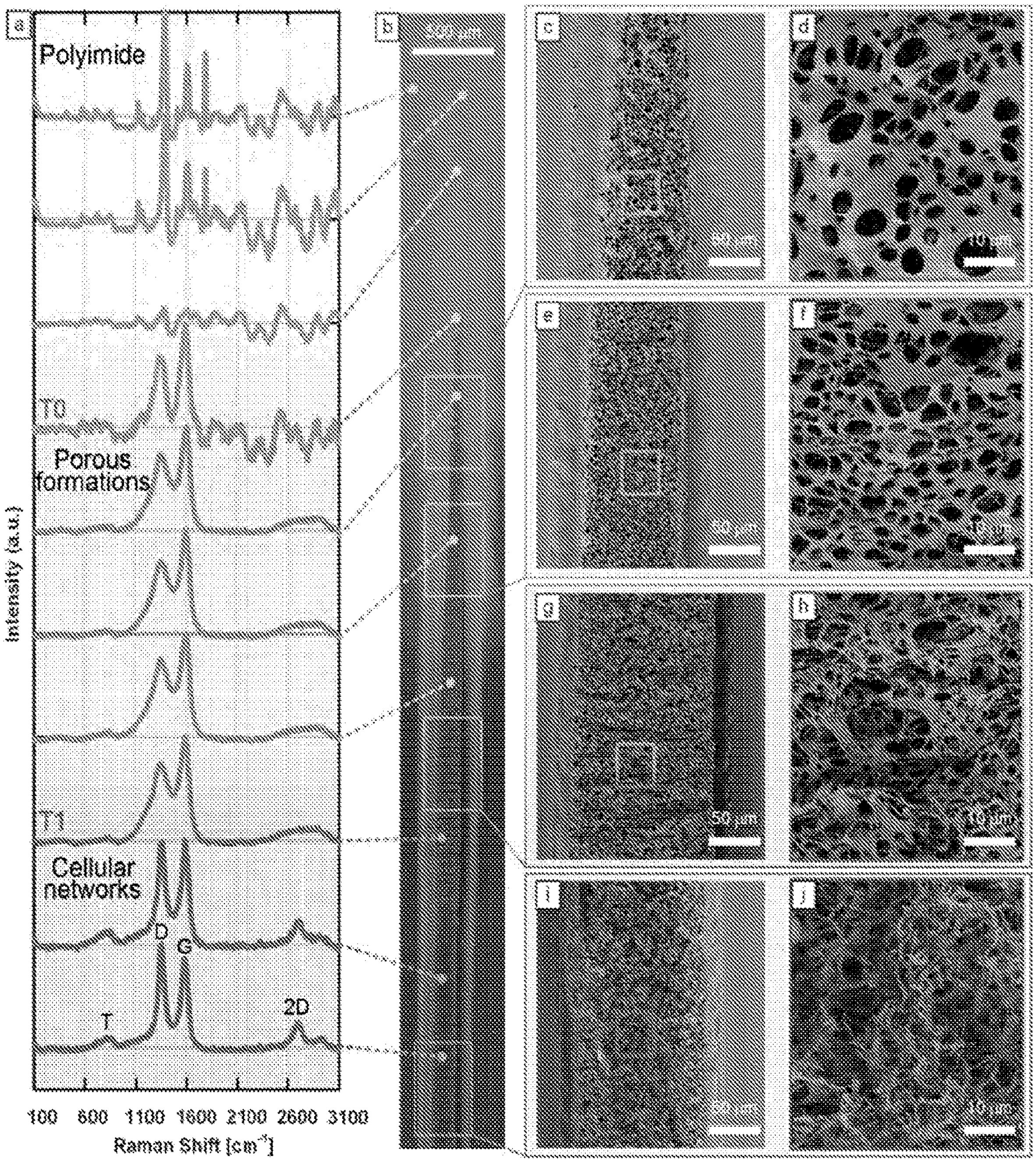
FIG. 3 illustrates: (a) Raman spectra of different points along the LINC line generated from tilted lasing at ψ=45% power 11.7 W and speed v=500 mm/s, showing the carbonization transition from polyimide to porous LINC (T0) as well the transition from isotropic porous LINC to cellular networks (T1). (b) Stitched SEM images of lased line. (c-j) SEM images along the line illustrating the different morphologies.
Figure 4:
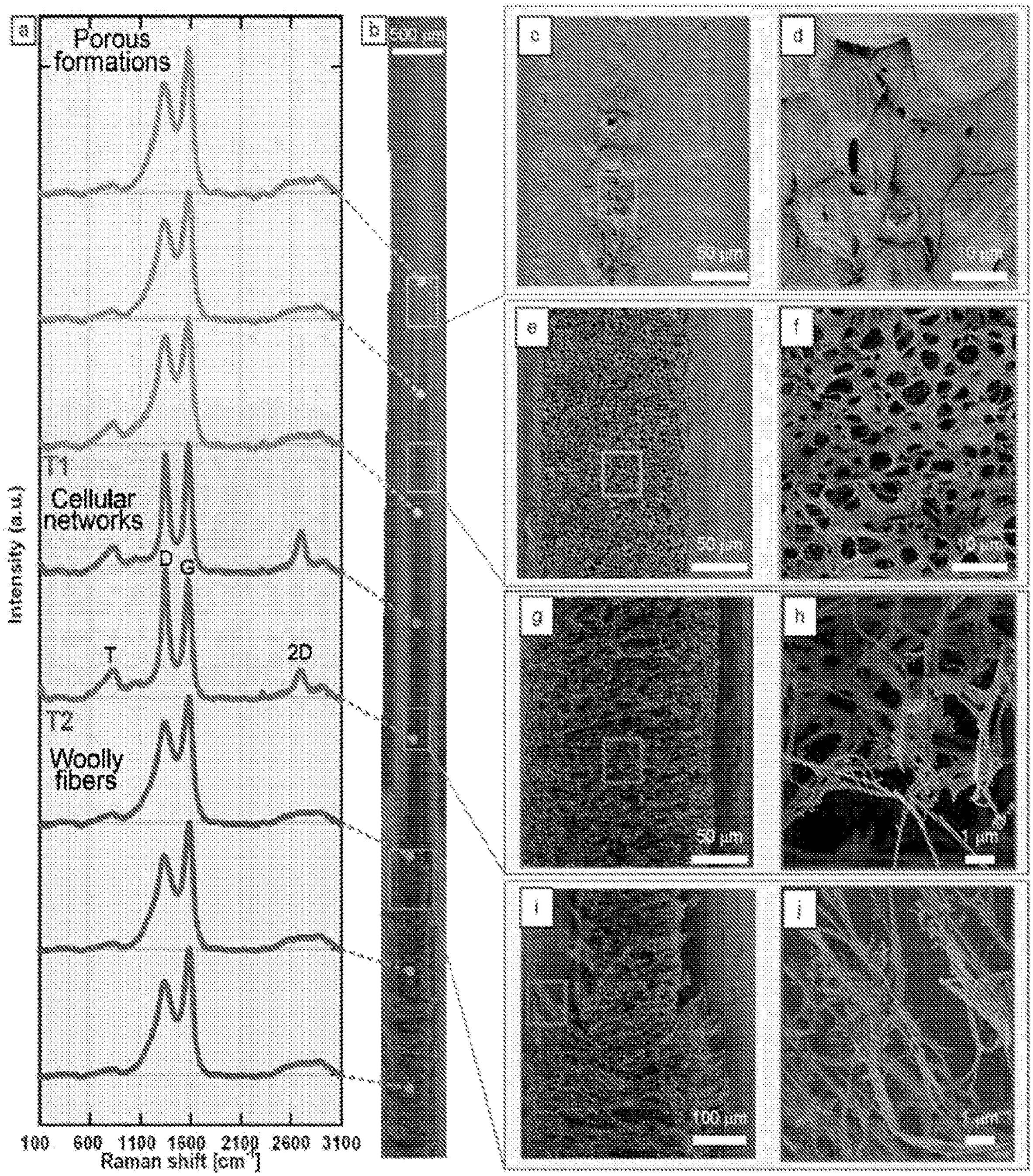
FIG. 4 illustrates: (a) Raman spectra of different points along the LINC line generated from tilted lasing at ψ=45, power P=18.4 W and speed v=500 mis, showing the transition from isotropic porous LINC to cellular networks (T1), as well as the transition to woolly fibers (T). (b) Stitched SEM images of lased line. (c-j) SEM images along the line illustrating the different morphologies.

To correlate the observed morphologies from the tilted lasing experiment to the molecular structure of LINC, Raman spectroscopy mapping was carried out along the lased lines for two power values, P=11.7 W (does not have woolly fibers at the center of the line) and P=18.4 W (has woolly fibers at the center of the line), as shown in FIGS. 3 and 4, respective. Raman spectra for different points along the lased line are shown in FIGS. 3(*a*) and 4(*a*), and top view SEM images of the lines are shown in FIGS. 3(*b*) through 3(*j*) and FIGS. 4(*b*) through 4(*j*). To gain a more comprehensive understanding of the evolution along the centimeters-long line, SEM images were stitched together going from the edge of the line to its center in FIGS. 3(*b*) and 4(*b*). Higher resolution SEMs of selected points along the line are set forth in FIGS. 3(*c*) through 3(*j*) and FIGS. 4(*c*) through 4(*j*).

The Raman spectra at points towards the edge of the lines prior to the formation of porous LINC display the characteristic peaks of polyimide at a Raman shift of 1395 cm$^{-1}$, 1601 cm$^{-1}$ and 1786 cm$^{-1}$ associated with C—N—C axial vibration, imide ring vibration and C═O asymmetric ring respectively. The background signal due to polyimide fluorescence was removed. Moving along the line with increasing average fluence, the Raman peaks associated with polyimide disappear and the G and D hands characteristic of graphenic nanocarbon appear, indicating the progression of carbonization after TO. The observed spectra exhibit C and D peaks with large full width at half maximum (FWHM) and broadband band around the 2D peak. The spectra have the same shape along the lased line until a stark change in shape is observed beyond the T1 transition, in particular, a sharper well-defined 2D band appears, accompanied by a marked decrease in G and D peak FWHM (from 150 cm$^{-1}$ to around 75 cm$^{-1}$ for the G peak), as shown in FIG. 3(*a*). The decrease of FWHM of the G peak indicates larger sp$^2$ grains. Hence, these changes suggest the formation of well-defined graphene domains concomitant with the transition from isotropic porous morphology to more anisotropic (as further demonstrated in FIG. 5 from side-view SEMs as discussed below) cellular networks of 3D graphene, as shown in the difference between FIGS. 3(*f*) and 3(*j*). A small peak was observed in the Raman spectra at 850 cm$^{-1}$, which was reported previously for laser carbonization of polyimide with a UV laser. That peak is consistent with the T band representing sp$^3$ vibration density of states, which was previously shown in ab inito calculations of Raman spectra.

Similar analysis is performed for the lased line at P=18.4 W (FIG. 4), showing the same transitions take place at higher power. In this case however, three morphologies are observed with both transitions T1 and T2 identifiable in Raman measurements and SEMs. At the T2 threshold, an abrupt transition into woolly fibrous morphology is observed (FIGS. 4(*i*) and 4(*j*)), which was not seen in the low-power (P=11.7 W) results shown in FIG. 3. Interestingly, the voluminous woolly fibers exhibit similar Raman spectra to the isotropic porous LINC that form between T0 and T1, with no sharp 2D peak and larger FWHM for the G peak compared to the anisotropic cellular networks that form between T1 and T2. These results suggest that the fibrous LINC formed beyond T2 generally have lower-quality $sp^2$ carbon than the anisotropic cellular networked structure formed between T1 and T2. This determination is important for tailoring the properties of LINC patterns, as will be shown for electrical conductivity measurements discussed below.

Figure 5:
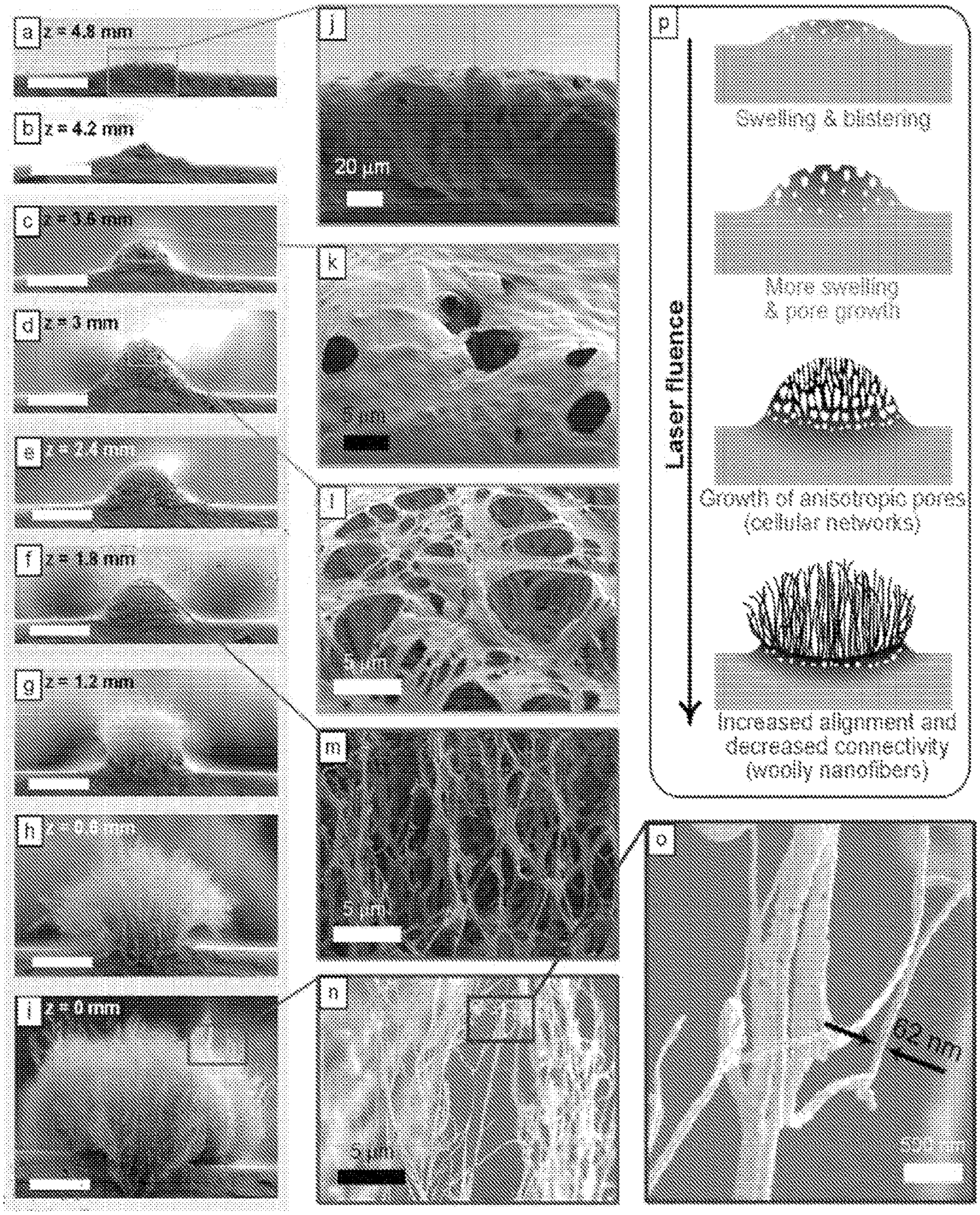
FIG. 5 illustrates (a-i) SEM images of side views of the edge of polyimide films lased to generate LINC, while untilted (ψ=0°) at different z values (Seale bar: 100 μm), (j-o) Higher resolution SEM images, (j) SEM showing the swelling of polyimide. (k) SEM showing pore formation and growth. (i) SEM showing increase in pore shape anisotropy. (m) SEM showing the formation of anisotropic cellular networks, (n) SEM showing the formation of LINC nanofibers. (o) High resolution image showing 60 nm nanofibers. (p) Schematic illustrating the evolution of LINC formation with increasing fluence, showing the transitions between different LINC morphologies.

To gain more insight into the obtained LINC morphologies, untilted polyimide films were lased at different z values for the same power P=18.4 W to change the average fluence values, SEM images of the side view of the films along the direction of lasing are shown in FIGS. 5(*a*) through 5(*i*), with high-resolution images shown in FIGS. 5(*j*) through 5(*o*). The images at the different levels of defocusing elaborate the evolution of the morphology with increasing average fluence (largest at z:=0 mm). At z=4.8 mm, some swelling is observed in the morphology as shown in FIGS. 5(*a*) and 5(*j*). With increased beam focusing (that is, less defocusing with smaller z=3.6 mm), more swelling of polyimide was observed along with the emergence of a clearly defined porous structure, having isotropic pores on the surface as shown in FIGS. 5(*e*) and 5(*k*). At z=3 mm, the pores appear to be larger in size and more anisotropic as shown in FIGS. 5(*d*) and 5(*l*). With further beam focusing, alignment emerges in a highly anisotropic cellular network structure at z=18 mm, as shown in FIGS. 5(*f*) and 5(*m*). Approaching z=0 mm, nanofibers form starting at z=1.2 mm, with progressively more voluminous woolly morphology, as seen in FIGS. 5(*i*) and 5(*n*). High-resolution SEM imaging shows that nanofibers of ≈60 mm form at z=0 mm FIG. 5(*o*).

These transitions capture the evolution of LINC morphology with increasing average fluence values. A model of these fluence-dependent transitions is illustrated schematically in FIG. 5(*p*), which shows the phenomenon of swelling and blistering of the polyimide, followed by the formation of pores that gradually increase in number, size, and anisotropy, leading to the formation of anisotropic cellular networks. Such 3D graphene networks become more aligned at higher fluence and eventually individual nanofibers emerge in voluminous woolly morphologies.

Establishing that the LINC information processes on the tilted and untilted samples are similar, at the same estimated fluence values, is important to generalize the results observed from the tilted experiments. The continuous nature of lasing across tilted samples could result in some dependence among the successive points along the lased path when compared with the lasing of flat untilted samples (at equivalent power, speed and z values). However, the equivalence between the tilted case and the untilted cases is demonstrated by three different approaches: analytical, numerical, and experimental as described below.

In the first, analytical approach it was shown that the energetics are equivalent, through average fluence calculations for both the tilted and untilted cases. However, equal fluence doesn't insure similar thermal response, because fluence represents the process energetics and not the kinetics. Hence, one needs to consider the time evolution of the temperature-dependent thermal diffusivity, phase transitions and laser material interactions.

To further elucidate the equivalence of laser heating across tilted and untilted samples, a 3D finite element model was developed with temperature-dependent material properties in ANSYS APDL finite element analysis software (available from ANSYS, Inc, of Canonsburg, Pennsylvania), to compare the temperatures (and rate of change of temperatures) experienced at similar levels of defocus for tilted and untilted polyimide at the same laser conditions. This technique has been used to model similar problems previously. The beam was modeled as a Gaussian distributed heat flux at the surface of the material Polyimide carbonization was modeled through defined temperature-dependent material properties. The simulations show that the tilted and untilted lasing at similar laser conditions can be considered equivalent from both an energetic and kinetic perspective, supporting analytical calculations hereof. The differences in temperature values between the flat untilted and the tilted cases are within 3% at the same levels of beam defocus (z=0-6 mm). The result highlights the fact that equivalent fluence values lead to similar temperatures (for the same power and speed). It was also observed that for the same level of beam defocus, the difference between the rate of temperature increase for the flat untilted case and the titled case is less than 20%.

In light of the results discussed above energetic and kinetic equivalence in the cases of laser heating across tilted and untilted samples, the most important aspect of equivalence is the similarity of LINC morphologies obtained in both cases. Hence, it was confirmed that the LINC morphologies obtained in the case of flat untilted lasing experiments shown in FIG. 5(*a*) through 5(*i*) match the morphologies resulting from tilted lasing experiments shown in FIG. 2(*e*) at P=1.84 W and v=500 mm/s.

Figure 6:
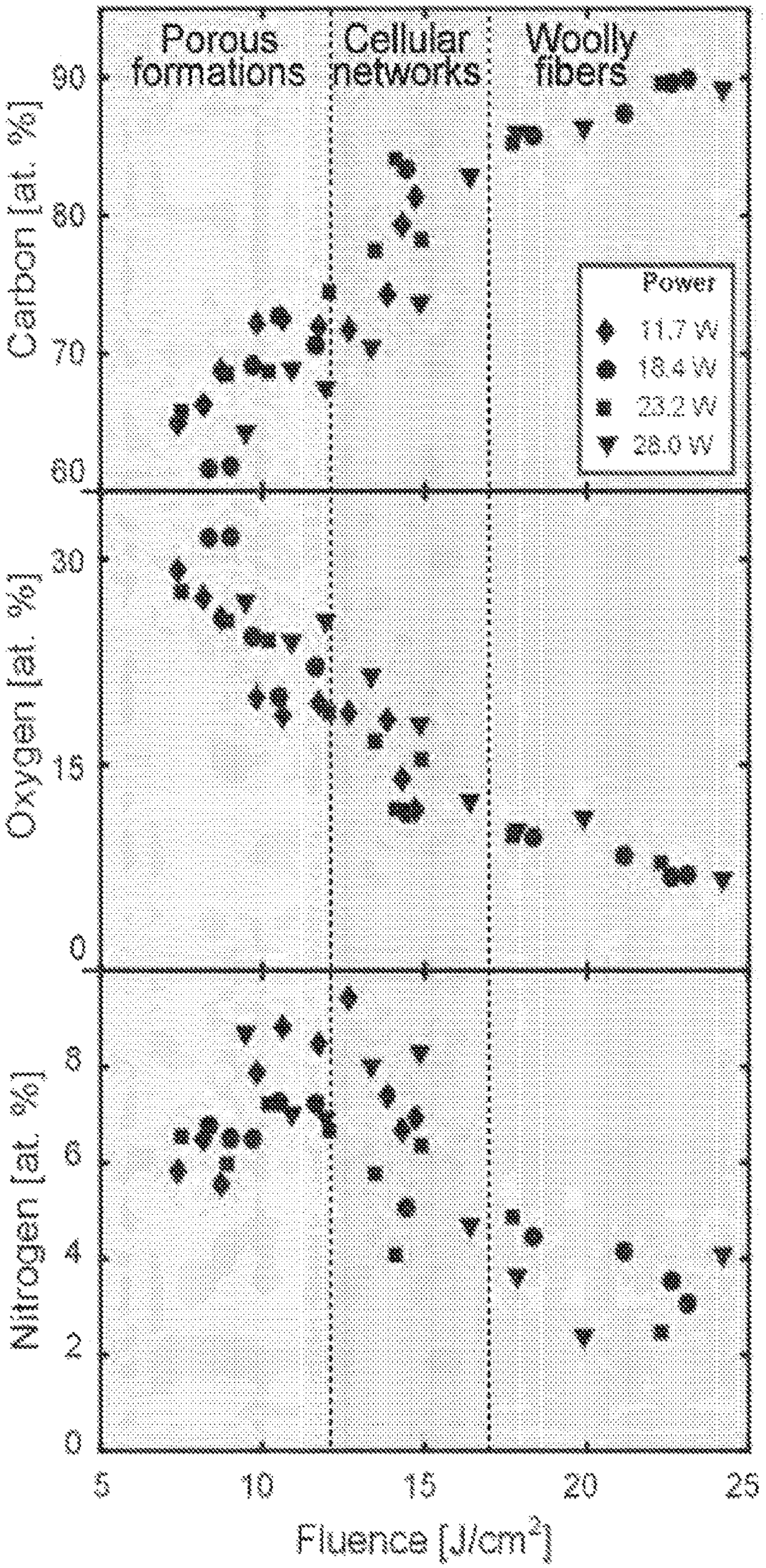
FIG. 6 illustrates: fluence-dependent elemental composition of LINC from XPS measurements represented as atomic percentage for carbon in (a), oxygen in (b), and nitrogen in (c). Results plotted here are collected from 38 survey scans at different points along the four lines lased on tilted polyimide substrate with ψ=45° at powers of 11.7, 18.4, 23.2, and 28 W.
Figure 7:
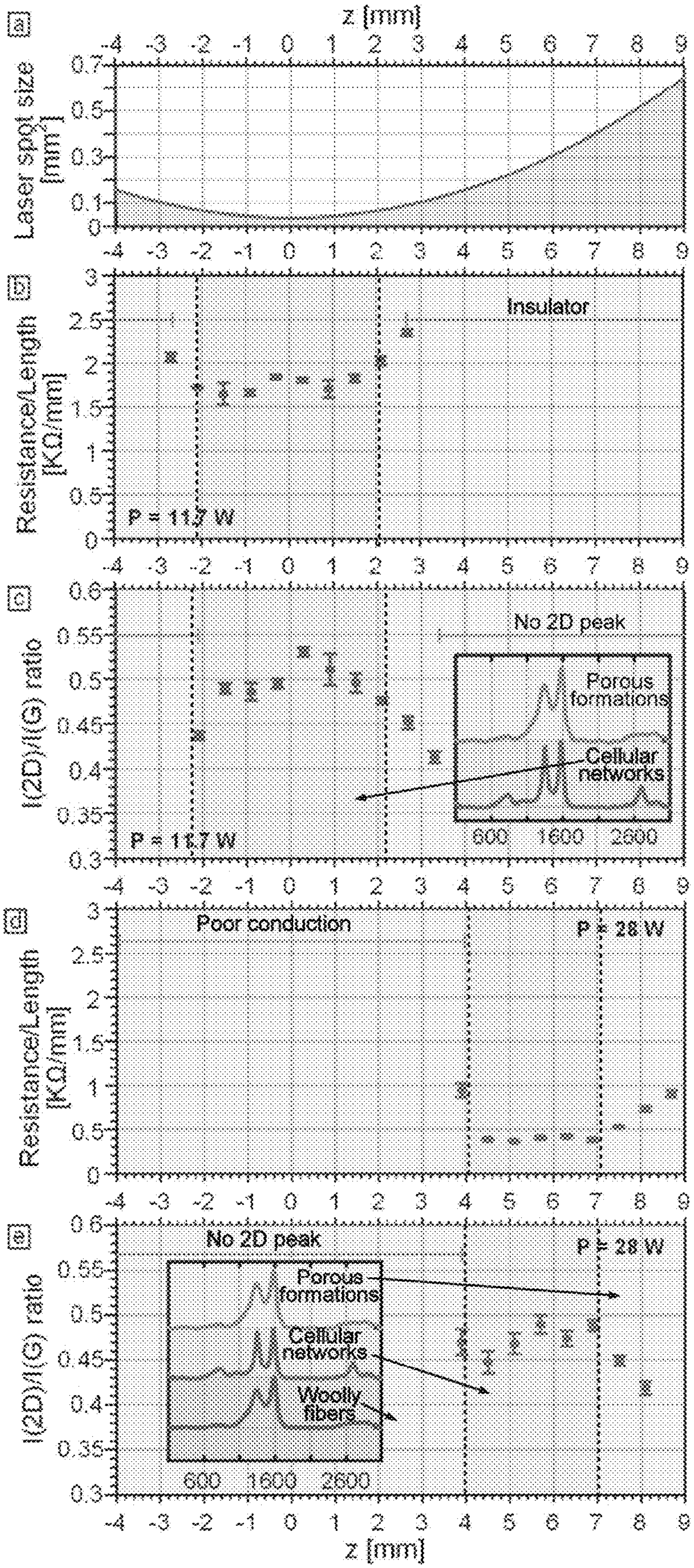
FIG. 7 illustrates: (a) Plot showing the change in laser spot area with z according to the laser beam profile, (b) Change in average R\L (average of 3 samples and error bars are standard deviation) with change in: value for the case of P=11.7 W, (c) Plot representing the change in average I(2D)/I(G) ratio(average of 3 samples and error bars are standard deviation) with changing spot size and fluence, (inset in c) Raman spectra at two different morphologies. (d) Change in R\L (average of 3 samples and error bars are standard deviation) with change in z value for the case of P=28.7 W, illustrating the drop of resistance with decreased spot size until the formations of highly insulating woolly fibers. (r) Plot representing the change in average I(2D)/I(G) ratio (average of 3 samples and error bars are standard deviation) with changing spot size and fluence for P=28.0 W, (Inset in e) Raman spectra at three different morphologies.

X-ray photoelectron spectroscopy (XPS) was used to characterize the fluence-dependent morphologies at several points along the lased lines (FIG. 6) using the tilted sample approach shown in FIG. 2 with γ=45 at different powers. The mathematical model describing the beam was then used to correlate each point across those lines to a fluence value. Accordingly, the atomic percentages of carbon, oxygen, and nitrogen were plotted as a function of fluence, as shown in FIG. 6. Results show that carbonization increases with fluence, owing to the progressive reduction in heteroatom content (oxygen and nitrogen). A rapid drop of both oxygen and nitrogen is observed after the T1 transition, which is also clearly observed in the C1s core scans, wherein the broad band between 286 and 288 eV disappear immediately after T1. This rapid loss of heteroatom content is concomitant with a marked increase in carbon content, which is also observed from the sharpening of the carbon-carbon peak in the CIs scan. On the other hand, after the T2 transition, slower increase in carbon and slower decrease in both oxygen and nitrogen are observed.

Plotting the evolution of elemental composition as a function of fluence is more insightful than plotting these values as a function of power, because fluence is a quantity that is normalized to the spot area, which changes along the laser path in our tilted lasing experiments (that is, there is a gradient of fluence along the lines even though the power and speed are constant, as shown in FIG. 2). Also, the fact that only individual lines were lased with no overlapping laser paths means that the fluence values calculated are truly representative of the energy delivered locally at each point on the substrate, as opposed to the case of rastering 21) pixel arrays (or overlapping lines), where changing power, not only changes fluence, but also increases the overlap between neighboring pixels.

Multiple processes are involved in the formation of LINC, which depend on factors like laser wavelength, laser intensity, fluence, IR absorption of the material and type of polyimide. These inputs drive the temperature and heating rate in the polyimide and hence control the level of liquification, outgassing and carbonization that occur. This, in turn, affects the resulting morphology and molecular structure and hence the resulting properties. Chemical reactions also drive these processes like thermal dissociation, and carbonization of the polyimide, solid-liquid phase transitions, plasma material interactions, melt expulsion and melt dynamics driven by Marangoni convection. In addition, the optical properties of the material can change, driving complex chain reactions, caused by the changing absorptivity of the material. Those processes can also depend on the gas environment and partial pressure. Moreover, they take place at different time scales, further complicating the phenomenon.

A number of noteworthy phenomena are observed in the studies hereof, which provide insight into the LINC formation process. For example, the transition to woolly fibers (T2) is clearly observed from the SEMs in FIGS. 4 and 5 by the significantly greater volume of carbon, which suggests that the kinetics of forming the woolly fiber morphology is faster than the kinetics of forming cellular networks and isotropic porous morphology. Hence, the rate of outgassing during laser irradiation is higher for higher fluence, which is also supported by the XPS results indicating more loss of oxygen and nitrogen at higher fluence (FIG. 6). This rapid jetting of gases out of the surface can also explain the increase of anisotropy in the porous structures that is observed after T1, as well as the alignment of the nanofibers after T2. In fact the mushroom-top geometry of UNC observed for fluence exceeding T2 (FIG. 5(*g*) through 5(*i*)) resembles high speed images of laser-induced splashing of polymers from literature. Without limitation to any mechanism, such splashing dynamics of liquefied polymers could drive the formation of aligned woolly nanofibers upon rapid conversion into solid carbon. Evidence of melting and solidification was also observed beyond T2 in high resolution SEM images of nanofibers, in the form of spherical nanoparticles on the LINC nanofibers, which suggest melting and beading up driven by surface energy minimization. Hence, the results hereof indicate that the liquification and rapid solidification, beyond T2 hinders graphitization of carbon and hence leads to the lower G and D peak FWHM and the disappearance of the 2D peak observed in Raman spectroscopy (FIG. 4). Moreover, at even higher fluence, exceeding 25 J/cm$^2$, the consumption of the polyimide leads to splitting of the film as the laser either ablates, melts, and/or chemically converts the whole thickness of the film.

A better understanding of the chemical transformations that take place during these transitions can be built on previous pyrolysis research on the evolution and graphitization of different types of polyimide at temperatures up to 3000° C., Such studies are based on transmission electron microscopy (TEM), Raman spectroscopy, infrared spectroscopy, and outgassing observations at different temperatures. Such studies show that carbonization of polyimide films occurs over two steps. Initially at a temperature of 500° C. to 650° C. there is an abrupt weight decrease of the films accompanied by the release of large amounts of CO and $CO_2$ This is followed by less weight loss and shrinkage due to evolution of small amounts of methane, hydrogen and nitrogen which can occur over a temperature range from 800° C. to above 1000° C., It has also been reported that nitrogen release continues in the second step of carbonization up to temperatures above 2000° C. and can be released abruptly. These findings further support the hypothesis that the morphology transitions observed (T1 and T2) are partly attributed to the rapid rate of gas released, especially when interacting with material jetting that can lead to the formation of nanofibers through rapid solidification of the jetted material. This mechanism of nanofiber formation is analogous to the fabrication of polymer nanofibers by electrospinning, albeit at much higher temperatures and more rapid heating/cooling rates.

The in situ polyimide pyrolysis studies were carried out using relatively low heating rates (≤30° C./min), compared to rapid, temperature increase rates typical in laser irradiation. Hence, they do not necessarily represent the same reaction pathways taking place during laser heating of polyimide, which is an inherently non-equilibrium process in contrast to the quasi-equilibrium process of the slow heating. Structurally, TEM studies of the pyrolyzed polyimide have shown that the slowly carbonized polyimide exhibited turbostratic structure with nano-scale elongated pores from temperatures as low as 650° C. up to temperatures as high as 2450° C., beyond which the carbonized polyimide graphitized into high quality flat layers of graphitic carbon sheets comparable to pyrolytic carbon.

To further understand how the observed morphology transitions affect the properties of LINC, 15 mm LINC lines were lased at different z values and two power values, P=11.7 W and P=%28.0 W in untilted configuration (ψ=0°). Using the two-point probe method, the resistance divided by line length (R/L) values are calculated from multiple resistance measurements at different lengths. First, the change in spot area as a function of z, according to the beam model is plotted in FIG. 7(*a*). The average R/L values for P=11.7 W and P=28 W are plotted in FIG. 7(*b*) and FIG. 7(*d*), respectively. For P=11.7 W, the polyimide is not conducting at z>3 mm and z<−3 mm. For z between −3 and 3 mm, the average R/L values are at their highest at the edges of the range with values between 2.1 kΩ/mm to 2.5 kΩ/mm, indicating that the connectivity of cellular networks in key for writing highly conducting LINC. These values of R/L are within the range of previously reported values for LINC. As the spot size decreases at values around z=0, R/L decreases to a value of around 1.65 KO/mm. The average carbonized line widths are noted to be ≈130 μm as confirmed from optical microscopy images.

Raman spectroscopy of these lines show a general inverse relationship between R/L values and the I(2D)/I(G) ratio. Indeed, we find that LINC with a well-defined and sharp 2D peak, exhibited the lowest resistivity. The average I(2D)/I(G) ratio starts at a value between 0.4-0.45 and increases for smaller spot size till a maximum value of around 0.53. Similar trends are observed in the I(G)/I(D) ratio where it reaches a maximum value of around 1.25. At higher power (P=28 W), R/L values are significantly smaller (FIG. 7(*d*)), with values ranging between 1 kΩ/mm and 0.4 kΩ/mm when compared to the lower power case. Again a decreasing trend is observed with beam focusing, with R/L decreasing from around 1 kΩ/mm at z=9 mm to around 0.4 kΩ/mm at z=7 mm as the porous morphology transitions into a more anisotropic cellular networks. The average value of R/L then remains constant until the onset of the fibrous morphologies where the resistance increases drastically. At z>4 mm (that is, below the T2 threshold for fiber formation), the line width was measured to be ≈250 μm as shown in FIG. S12 (b).

The I(2D)/I(G) ratio for P=28 W are generally similar to those obtained for P=11.7 W, with values between 0.42 at z=8 mm, and 0.49 at z=7 mm. Importantly, the disappearance of a sharp 2D peak at the onset of fiber formations (around z=3.8 mm) is accompanied by a drastic drop in conductivity. The conductivity of the LINC lased at P=28 W and v=500 mm/s is estimated to be around 5 S/cm, matching previously measured LINC conductivities, and superior to unannealed ink-jet-printed graphene. The resistivity could possibly be further increased by further optimizing the laser parameters such as speed or releasing.

Taken together, the electrical resistivity measurements hereof agree with the structural changes observed in the Raman spectra of FIGS. 3 and 4, which demonstrate that the first transition (T1) is associated with the decrease in FWHM of the G and D peaks and the emergence of the 2D peak. Relatively high FWHM in the G and D peak is typically associated with amorphous or disordered carbon and is noted in low temperature carbonization of polyimide, with an expected high resistivity. On the other hand, smaller G peak FWHM is strongly correlated to the degree of graphitization and defect level, which are important for lower resistivity nanocarbons. Moreover the emergence of the 2D peak is also evidence of large structural changes in the graphitic domains between T1 and T2. Disappearance of the 2D peak and increase in the FWHM of both G and D peaks are characteristics of the Raman spectra for fluence higher than the second transition (T2), producing woolly fibers with large volume. From the resistance measurements, it is clear that these complex interactions underlying fiber formation at high fluence values result in very low conductivity LINC that is not suitable for applications as electrodes, highlighting the importance of modulating fluence during LINC formation (that is, too small or too large fluence values prevent the formation of conducting LINC).

Two analytical approaches are typically used to understand how lasers interact with polymers. The first is the thermal approach, which focused on calculating the temperature rise in the material. The second is the fluence-based approach, which focuses on calculating the delivered laser energy in the material. Thermal models require estimating material properties of polyimide and LINC and are difficult to validate experimentally since it is difficult to measure the temperature at the laser spot; hence, they are generally more complex than fluence-based models. The devices, systems, and methods hereof provide a fluence-based approach for understanding LINC formation, based on Gaussian beam modeling, which is of a great utility from a manufacturing perspective. Though focus on lasing individual. LINC lines in air, instead of areas formed by overlapping laser paths, the effect of multiple lasing of some regions on the surface is avoided. Multiple lasing greatly complicates the analysis and hinders extracting fundamental insights into the process-structure relationships for LINC formation. Lasing lines also has an advantage over lasing individual spots, because one can circumvent laser power transient effects that are associated with laser ramping up when starting. By ignoring the initial portion of the lased LINC lines, one can ensure that steady state power is reached, when investigating the rest of the line or its end. In fact, when lasing our LINC lines it was sometimes observed that the initial spot has a drastically different morphology than the rest of the line, which is attributed to power transients in the laser.

Figure 8:
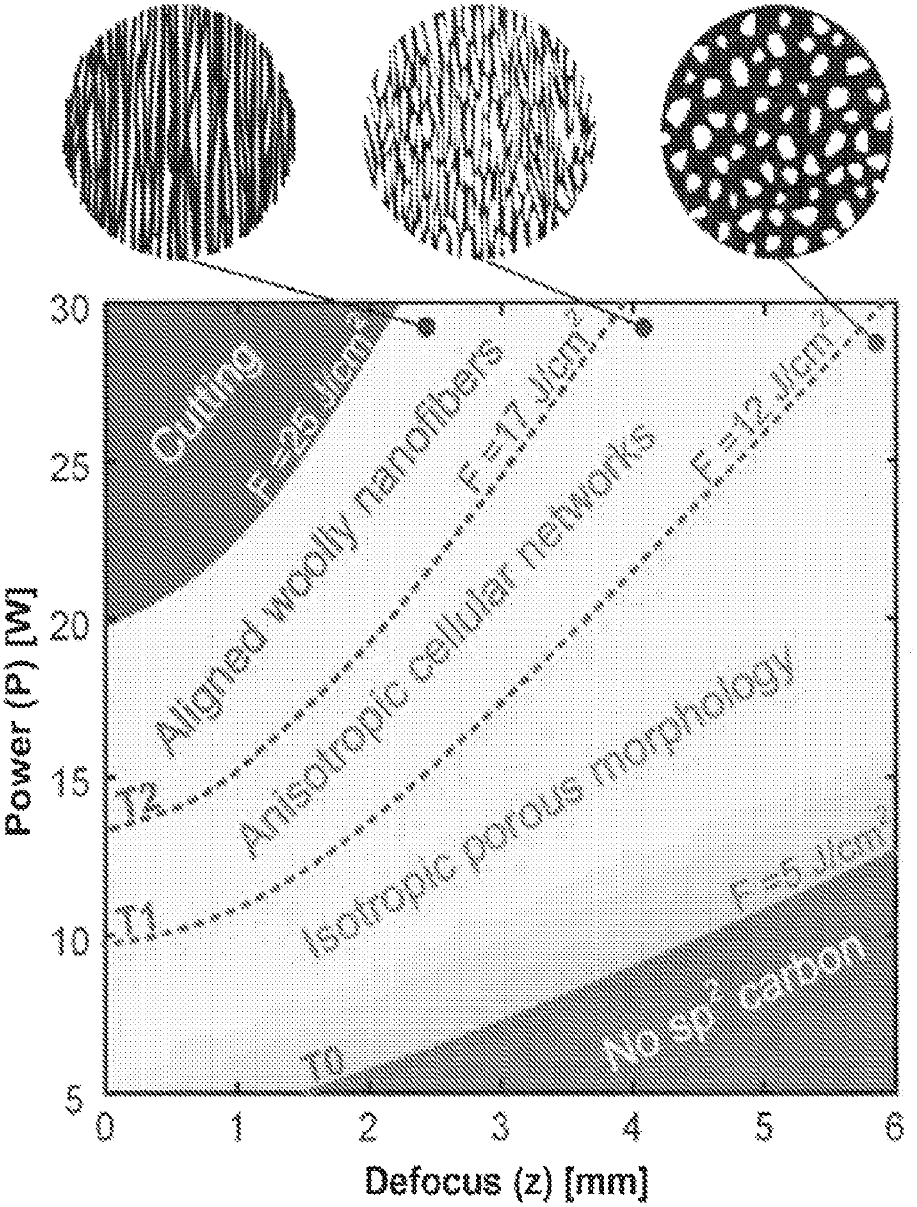
FIG. 8 illustrates a morphology diagram mapping the ranges of laser parameters (power and degree of beam defocusing) for creating different types of LINC (isotropic porous morphology, anisotropic cellular networks, and aligned woolly nanofibers) for CW $CO_2$ laser (wavelength A=10.5 mm) scanning at to v=500 mm/s. Experimentally obtained threshold fluence values for T1 and T2 are plotted as constant fluence lines (dashed).

In addition to elucidating the fluence-dependence of morphology, molecular structure, and electrical conductivity of LINC, the methodology hereof also enables generating maps of resulting morphologies as a function of accessible laser processing parameters (or ranges thereof), such as power and defocus, which can be easily controlled. FIG. 8 shows such a morphology diagram with delineated transitions represented as iso-fluence contours, which is enabled by the insight that transitions happen at threshold values of laser fluence. Such a fluence-based diagram is of great utility for practical purposes to facilitate replication of results across different processes and using different laser processing systems. Moreover, the approach of plotting the morphology diagrams is useful for studying the influence of pressure and gas environment on LINC. Hence, more insight into the influence of these environmental factors on the evolution of both the chemistry and morphology of LINC can be obtained by carrying out fluence-dependent LINC formation studies under controlled gas conditions.

Varying Speed Studies.

The studies discussed above show that when lasing individual lines with a spatially varying fluence gradient at a specific lasing speed (500 mm/s), discrete morphologies were observed, which were either of porous, cellular or fibrous nature. These morphologies were correlated to chemical and structural changes, and were observed at defined thresholds of fluence, confirming that an energetic approach to understand the process is valid at least at a fixed speed with different laser power values, despite the non-equilibrium nature of the process.

However, the same fluence value delivered at different values of speed can vary drastically in terms of temperature and temperature change with time, which can greatly affect the resulting morphology and carbonization. It is important to determine if morphologies of LINC be related to specific temperatures or temperature rates (that is, energetically controlled/limited or kinetically controlled/limited) Moreover, it is important to determine if the process energetics and kinetics influence the chemistry and gas release in process.

An approach similar to that described above was used to analyze laser nanocarbon formation through lasing lines with continuously varying laser fluence at different speeds to facilitate understanding the process kinetics. The resulting lines represent a map of a wide range of conditions, allowing precisely identifying morphological, structural and property changes. Through lasing at a fixed power and different speeds ranging from 100 mm/s to 500 mm/s at a power of 28 W, a more complete picture including process kinetics was determined.

Such an approach enables studying the evolution of nanoscale morphology and atomic structure continuously at different fluence values on the same polymeric (polyimide) film to investigate the influence of speed on morphology and structure. The experimental results were integrated with two energetic based approaches for estimating fluence (an area averaged fluence approach and a two-dimensional fluence model) to test whether a fluence-based approach can explain the results. Additionally, to get a deeper understanding of the process kinetics, the experimental results were integrated with thermal simulation results and the results correlate with process temperatures and temperature increase rates.

Figure 9:
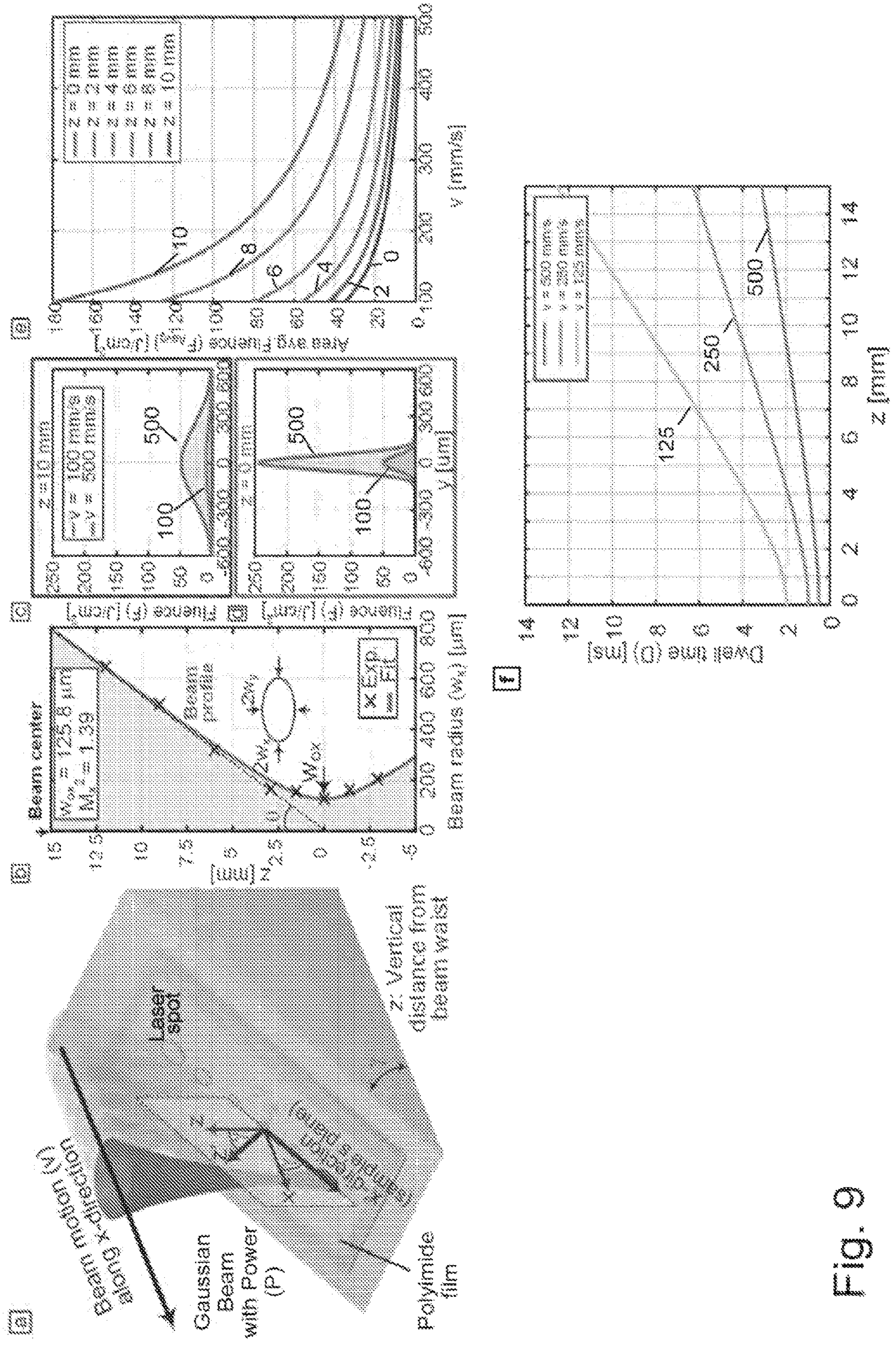
FIG. 9 illustrates: (a) Schematic illustrating the experimental setup with laser with power P, speed v lasing a polyimide sheet tilted by angle γ. (b) Plot representing the estimated laser beam profile along the x direction, along with the profile of the fitted Gaussian beam (c) Distribution of fluence along the y-direction at P=28 W, v=100, 500 mm/s and defocus z=10 mm. (d) Distribution of fluence along the y-direction at P=28 W, v=100, 500 mm/s and defocus z=0. (e) Plot showing the influence of defocus and speed on area averaged fluence FAavg. (f) Plot illustrating the influence of speed on laser spot dwell time.

In a typical LINC process, a laser beam with power P is scanned across a polyimide sheet at a speed v with the sample surface at a distance z from the beam waist. In the varying speed studies hereof, the polyimide sheet was exposed to a spatial gradient of fluence by lasing a tilted sample of polyimide. This methodology enables different points on the linear lasing path to be exposed to different beam spots having different size and fluence. A schematic of the experimental setup, which is essentially the same as that of FIG. 1(*a*), is shown in FIG. 9(*a*), which illustrates the polyimide sheet lased at an angle ($\gamma$=45°). The schematic of FIG. 9(*a*) shows the laser beam, assumed to be a Gaussian beam, moving in a horizontal direction x at a speed v, wherein the sample is tilted along the x' direction. The spot size changes with z and it also changes as well as along the x' direction on the sample.

The beam profile of the continuous $CO_2$ laser ($\lambda$=10.6 μm) used for varying speed studies is once again depicted in FIG. 9(*b*), estimated from beam characterization experiments described above. Beam power and profile measurements were used to estimate the laser intensity profile at the different z values and at different spot sizes and powers. The tilting of the beam changes the beam intensity distribution and the geometry of the beam spot. As set forth above, however, it has been demonstrated that for the beam parameters used here, the average fluence value for the flat case is approximately equal to the tilted case for our values of beam parameters and the conclusions derived from tilted polyimide experiments can be generalized to flat lasing.

An example is shown in FIGS. 9(*c*) and 9(*d*) which shows the change of fluence distribution F across the beam for two z values and two speed values at the same laser power. A more focused beam has a sharper beam intensity, however it has a smaller spot size, which decreases the dwell time of the laser spot, which corresponds to how long a point is exposed to the laser beam. Additionally, changing the speed also changes the dwell time, with higher dwell times at lower speeds and hence higher delivered fluence. The influence of speed on dwell time is shown in FIG. 9(*f*). The interaction between the beam dwell time and laser intensity can be used to tune the value of fluence distribution (F) across the beam and area averaged fluence (FAavg), which would in turn influence the temperature increase at a point. The change in area averaged fluence FAavg with laser speed at different focusing levels is shown in FIG. 9(*e*), illustrating the extent of speed influence on delivered fluence. FIG. 9(*e*) also illustrates that equivalent levels of fluence exist at different speeds and defocus level, despite different laser conditions.

Figure 10:
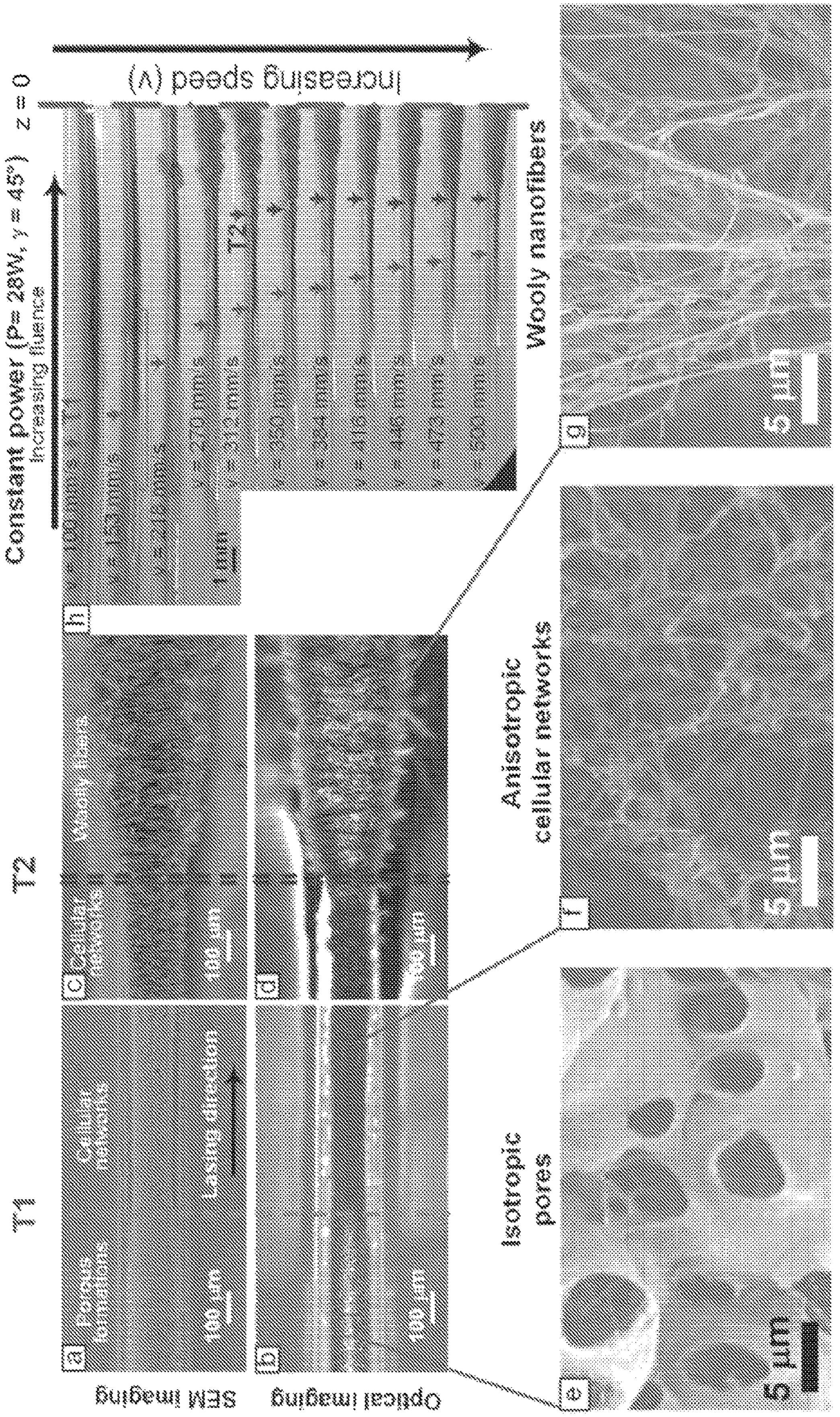
FIG. 10 illustrates: (a,b) SEM and optical imaging of the porous to cellular network transition at location T1 along lased LINC line at lasing conditions P=28 W, ψ=00 mm/s. (c,d) SEM and optical imaging of the cellular network to woolly fiber transition at location T2 along lased line, (e) SEM image before T1, illustrating isotropic pore-based morphology. (f) SUM image illustrating the anisotropic cellular network formations after T2. (g) SEM image illustrating the woolly nanofibers forming after threshold location T2. (h) Optical image showing the lines lased at P=28 W and speeds v=100, 153, 218, 270, 312, 350, 384, 416, 446, 472, 500 mm/s and tilting angle γ=45° illustrating the locations of the transitions along the lines.

The sample was lased at a constant power P=28 W at different beam speeds ranging between v=100 and v=500 mm/s, consisting of 11 lines as shown in FIG. 10. Fully stitched SEM imaging and optical imaging were conducted for the lines. As demonstrated in the studies discussed above, two morphological transitions thresholds are generally observed at high lasing speeds ranging from v=500 mm/s to v=312 mm/s under optical and SEM imaging. Initially, LINC lines exhibit a porous morphology as observed in SEM and optical microscopy imaging as shown in FIGS. 10(*a*) and 10(*e*). This porous morphology is also characterized with a shiny appearance under optical microscopy as illustrated in FIG. 10(*c*) and isotropic pores on the surface observed under SEM as illustrated in FIG. 10(*e*). With increasing fluence, the porous morphology undergoes an abrupt transition into an anisotropic cellular networks at threshold location T1 that undergoes an area averaged value of fluence FT1. This threshold is characterized by the loss of the shiny character of the surface (FIGS. 10(*a*) and 10(*c*)) and the transition of the surface pores into of an anisotropic LINC network as seen under SEM imaging as illustrated in FIG. 10(*f*). With increasing fluence, a second abrupt threshold is noted at location T2, experiencing fluence FT2. This threshold is characterized with the abrupt transition from the cellular formations into a large volume woolly fibrous as observed under SEM and optical imaging shown in FIGS. 10(*b*) and 10(*d*). The woolly fibers formations have a distinct large volume and exhibit nanoscale fibers (FIG. 10(*g*)) and some level of alignment between them. This transition is typically associated with the thermal stability of the polyimide which is related to its backbone chemical bonding. The T1 and T2 locations for the different lines lased at different speeds are marked in an optical image in FIG. 10(*h*). The T2 transition is no longer observed at speeds lower than v=312 mm/s with only T1 transitions observed at v=218, 153, 100 mm/s.

Figure 11:
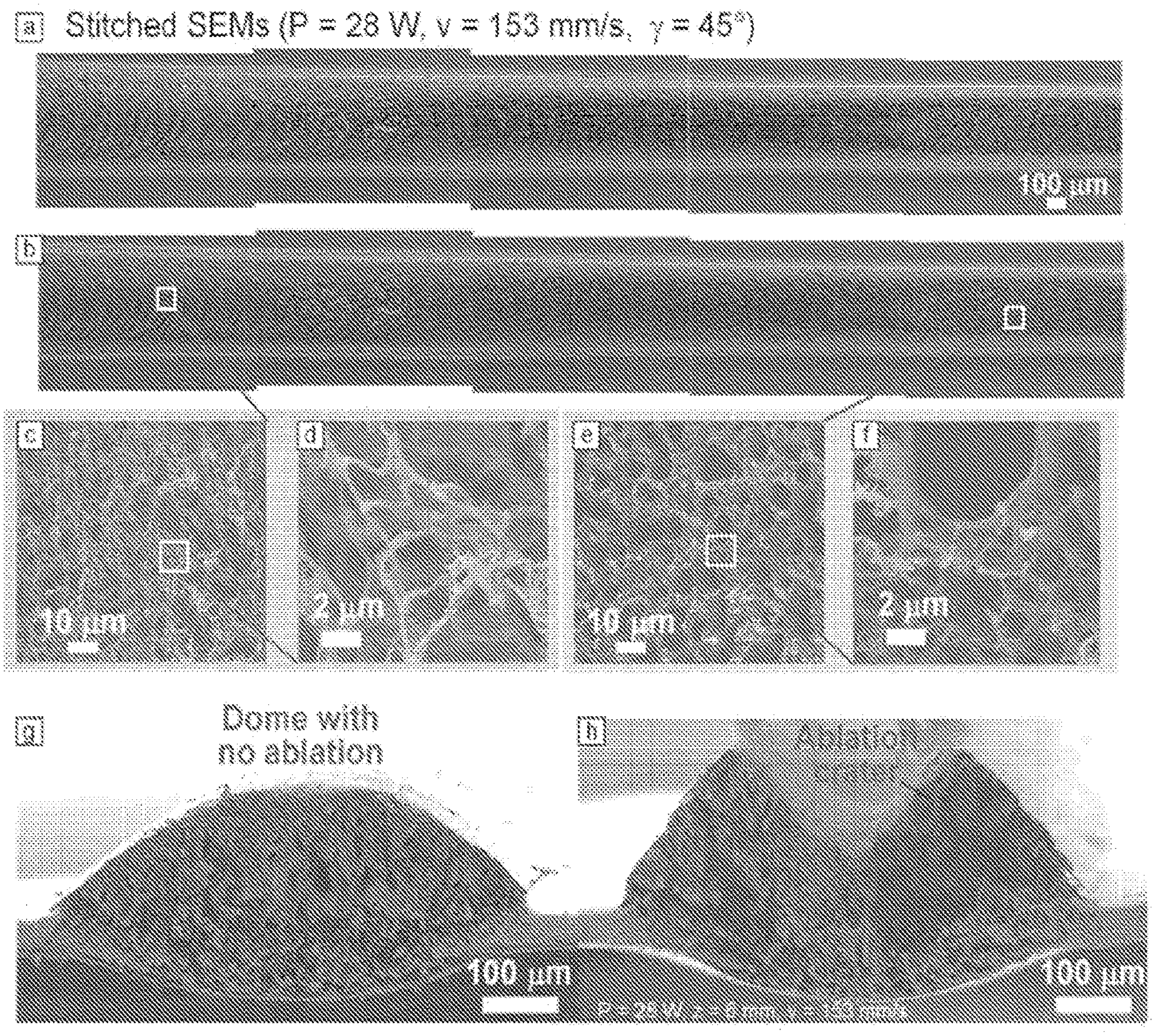
FIG. 11 illustrates: (a,b) Stitched SEM images illustrating the onset of ablation, starting at location T3 at P=28 W, v=153 mm/s and γ=45°, (c,d) SEM images illustrating the morphology prior to the onset of ablation, exhibiting a cellular network morphology. (e,f) SEM images illustrating the morphology after the onset of ablation, demonstrating a hierarchical porous morphology. (f,g) SEM images showing the cross-sectional view of two LINC electrodes lased at two defocus levels, illustrating the effects of ablation on cross section and showing formation of the ablation crater associated with the threshold.
Figure 12:
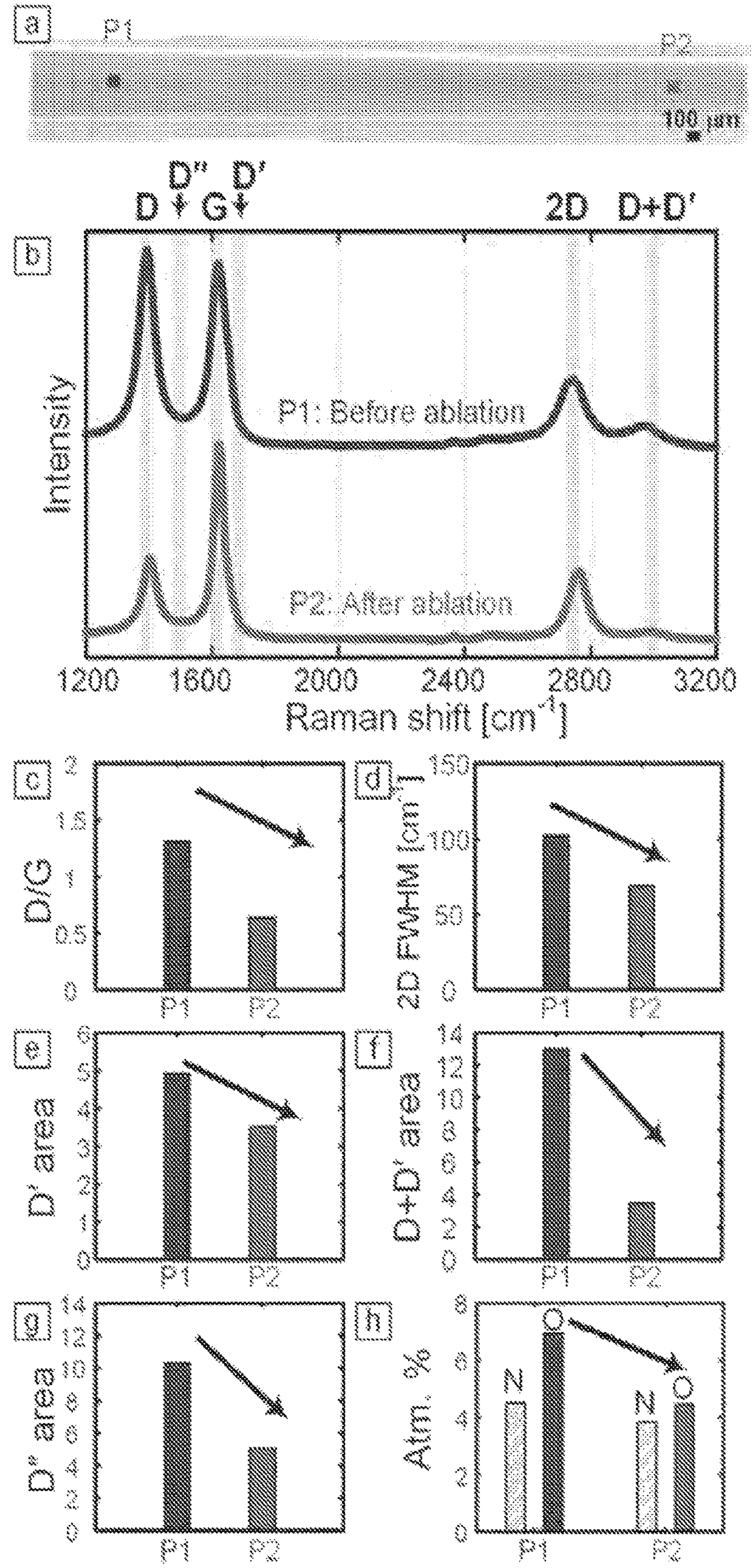
FIG. 12 illustrates: (a) SEM image including location T3 at P=28 W, v=153 mm/s and γ=45' with Raman spectroscopy locations P1 and P2, before and after T3 respectively. (b) Raman spectrum at P1 and P2, illustrating the locations of the G, D, 2D, D', D" and D+D' peaks. (e-g) Bar plots showing the difference in D/G peak area ratio, FWHM, D' area, D±D" area, D' area at points P1 and P2. (h) Bar plot showing the difference in N, O atomic % before and after ablation threshold T3, derived from XPS survey scans.

At slower speeds between v=270 and 100 mm/s, the T1 transition was observed with increasing fluence, however, with further increased fluence, a new, previously unreported transition was observed which is characterized with the gradual ablation of the cellular networks following the T1 transition. While ablated morphologies have been reported, the conditions governing their occurrence are not completely understood and are first reported in the present studies. The transition is demonstrated in FIGS. 11(*a*) and 11(*b*) at v=153 mm/s, which show a number of stitched SEM images along the lasing path with false coloring marking the onset of this ablation. Higher resolution SEM imaging show the difference between before the onset of ablation in FIGS. 11(*c*) and 11(*d*) and afterward in FIGS. 11(*e*) and 11(*f*). With increased ablation, a hierarchical porous network is revealed. The transition was gradual in nature. A hierarchical pore structures beneath was revealed. This hierarchical porosity exhibits multiple scales of porosity as was seen in high resolution SEM imaging which potentially has high surface area than prior to the transition. When lasing LINC electrodes on flat polyimide sheets, this same phenomenon can be observed, with the LINC electrodes exhibiting a dome shape at higher defocus values and an ablated crater on top after ablation onset with more beam focusing. This is illustrated in FIGS. 11(*g*) and 11(*h*), which shows cross-sectional views of lased electrodes. To understand if this transition is correlated with any structural or chemical difference. Raman spectroscopy and XPS analysis was conducted before and after the onset (see FIG. 12). As set forth above, the T1 transition from porous to cellular networks is reflected on the Raman spectra with the appearance of the 2D peak, which would typically be non-existent in porous morphologies. Raman spectrum conducted at point P1 and P2 (FIG. 12(*a*)) before and after ablation at v=153 mm/s is shown in FIG. 12(*b*), showing the existence of a 2D peak for both spectra, but also a marked decrease in D/G ratio after ablation onset. Deconvolution of the G, D and 2D peaks was done to extract peak parameters to accurately compare differences. The Raman results are summarized in FIG. 12(*e*) through 12(*g*). The results show a marked decrease in area-based D/G ratio after ablation from a value of 1.47 to 0.64. Additional decreases are noted in 2D FWHM, D' area, D+D' area, D" area all of which indicate higher $sp^2$ crystallinity, improved stacking and less defects post ablation. Representative XPS spectroscopy is also conducted before and after ablation. Corresponding C Is, N1s, O1s, C KLL scans were also conducted for in depth analysis of any chemical transitions and $sp^2$ content analysis. The C1's core scans were carried out with deconvolution analysis. The survey scan and the atomic percentage analysis clearly indicated a decrease in O and N heteroatom content post ablation shown in FIG. 12(*h*). This result is also clear from the O1s, N1s core scans with a notable increase in signal to noise ratio post ablation as. The Cis core scan exhibits a graphitic nature, similar to HOPG C1s spectrum. The deconvolution analysis indicates a decrease in C—CH and C—O—C area, which is confirmed by a survey scan analysis with the drop in atomic Oxygen percentage. Additionally, C KLL analysis, to calculate the D parameter indicates dominant $sp^2$ bonding before (D=19.5 eV) and after ablation (D=20.25 eV). From the Raman and XPS analysis, it is clear structural changes are associated with T3, with higher graphitic crystallinity post ablation. There is some evidence for chemical changes that are associated with the increased carbonization at higher fluence and not necessarily the onset of ablation.

Figure 13:
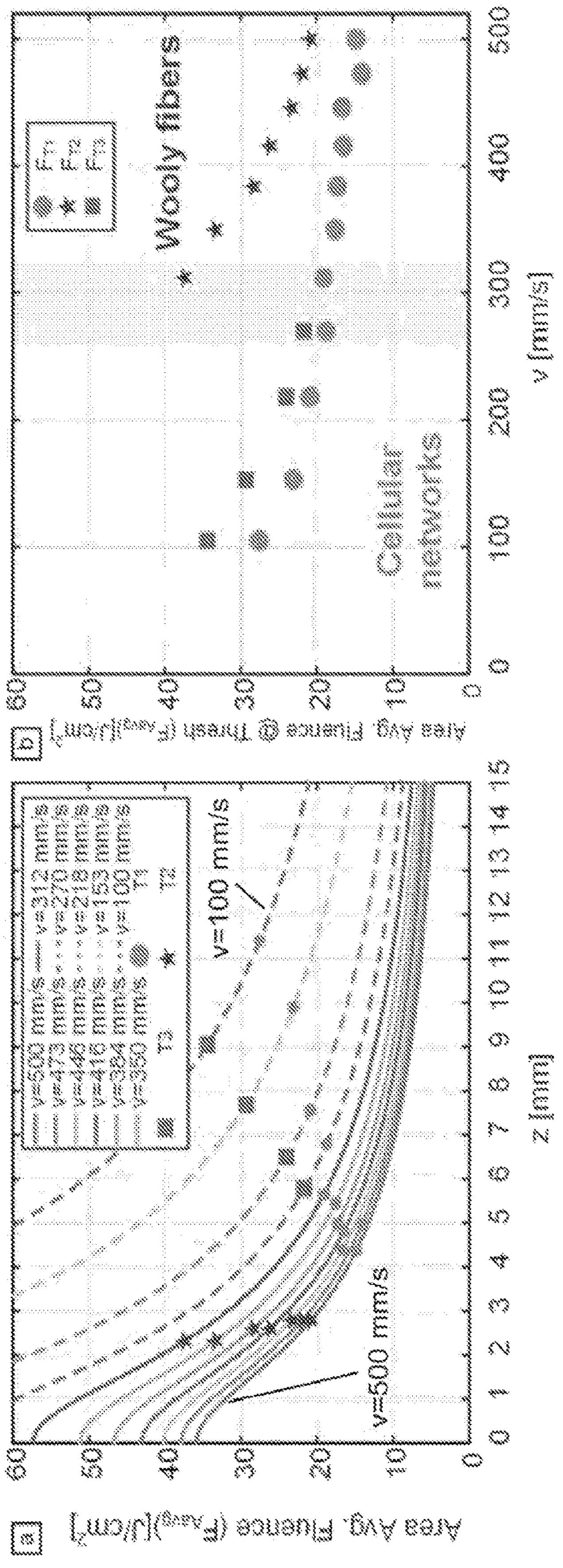
FIG. 13 illustrates: (a) Plot of estimated area averaged fluence FAavg as a function of defocus z at different speeds, with the transition locations T1, T2 and T3 marked on the curves at each speed. (b) Plot illustrating the values of area average fluence at T1, T2 and T3 for each speed, showing the influence of speed on the fluence at transition.

Using SEM and microscopy imaging, the locations of T1, T2 and T3 can be precisely identified along with the area averaged fluence values. These values can be used to investigate whether the occurrence of these thresholds is speed dependent and provide insight into the influence of process kinetics on the thresholds, FIG. 13(*a*) shows the change in estimated area averaged fluence ($F_{Area}$) with level of defocus and speed. Additionally, the experimental locations (converted to z coordinate) of the T1, T2 and T3 thresholds are marked on the curves to estimate the fluence values at which these transitions occur. FIG. 13(*b*) shows a plot with the values of the fluence at the transitions for each speed value and hence illustrate the influence of lasing speed on these thresholds. At v=500 mm/s, the threshold values are estimated to be FT1=15 J/cm2 and FT2=20 J/cm2, similar in value to what was set forth above. At speeds between 350 mm/s and 500 mm/s, slight increase can be observed in FT1 indicating a weak speed dependence. However, a strong speed dependence is observed with FT2 with the transition happening at higher values of fluence at lower speeds. For example at v=350 mm/s, FT2=38 J/cm2 and FTJ 19 J/cm2. At speeds between 100 min/s and 350 umm/s both FT1 and FT3 exhibit speed dependence, showing evidence of kinetics influence at lower speeds.

From SEM imaging of T3 in FIG. 11(*a*), it is observed that the distribution of beam intensity and hence fluence affects the T3 transition, since the transition occurs initially at the center and extend across with increased fluence down the lasing path progressively. To precisely map the curves marking the onset of ablation and estimate the onset threshold, image processing techniques were use. That process exploits the change in image contrast accompanying the onset of ablation. The process is presented in FIG. 14. Initially, stitched SEM images of the transition are contrast adjusted as illustrated in FIG. 14(*a*) for v=153 mm/s.

Figure 14:
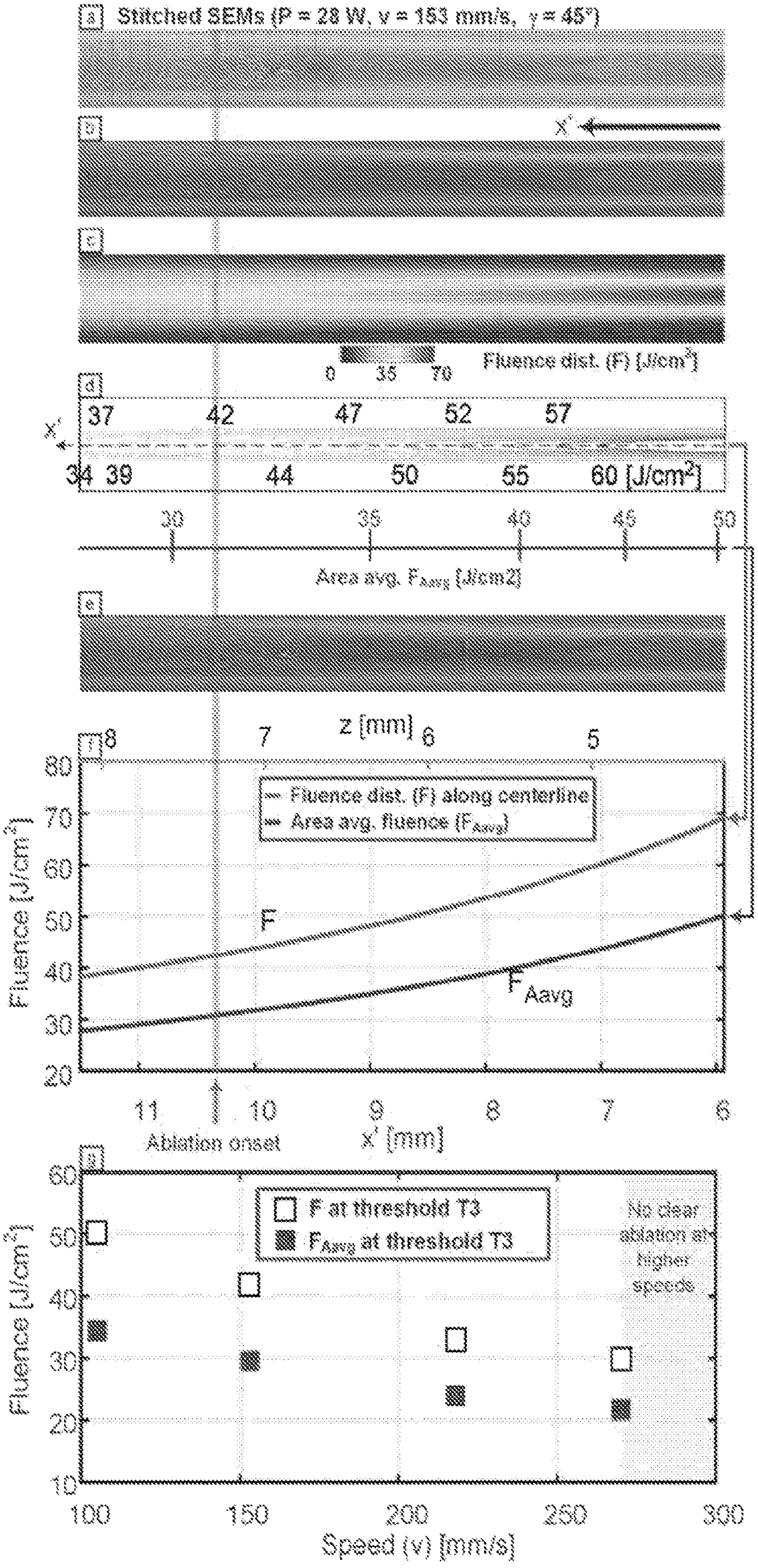
FIG. 14 illustrates a process to identify the fluence thresholds at onset of ablation illustrating: (a) SEM image at P=28 W and v=153 mm/s at T3. (b) SEM image with false coloring, with the red areas marking the edge of areas with ablated LINC, identified with edge detection methods. (c) Estimated fluence distribution (F) corresponding to previous figure. (d) Isofluence lines at area corresponding to (b,c) with values of area averaged fluence $F_{Aavg}$ at equivalent locations below. (e) SEM image with overlaid edge of ablation, identified in (b), (f) Plot of fluence distribution F along lasing path center line and area averaged fluence $F_{Aavg}$ as a function of defocus z and correspond x' values with location of ablation onset T3 marked. (g) Plot of values of fluence and area averaged fluence at ablation thresholds as a function of lasing speed, illustrating speed dependence and the lack of clear ablation at speeds higher than v=300 mm/s.

MATLAB based edge detection techniques were used to detect the edge of ablations illustrated in the false-colored image in FIG. 14(*b*). To find the values of fluence associated with the transition, a new model of fluence (F) was used to create a spatial fluence map, as shown in FIG. 14(*e*) and hence an isofluence map that was generated and aligned with the SEM images, shown in FIG. 14(*d*). The area averaged fluence FAavg which is a function only of defocus (and hence x') is also shown in FIG. 14(*d*). The values for centerline 2D fluence (F) and the area averaged fluence FAavg are both plotted in FIG. 14(*f*) as a function of x' and corresponding defocus z. Using the SEM imaging, imaging processing and the 2D and area average fluence modeling, the fluence values at the onset of ablation can be precisely identified. For v=153 mm/s, F2DT3=42 J/$cm^2$ and FT3=31 J/$cm^2$. This process was repeated for other speeds with detectable ablation, and the results are plotted in FIG. 14(*g*). Similar to FT2, a speed dependence was also observed, with the value of the F2DT3=52 J/$cm^2$ at v=100 mm/s and F2DT3=30 J/$cm^2$ at v=270 mm/s. Another observation from SEM imaging was the occurrence of both ablation and fiber formation at a speed v=270 mm/s. This important finding indicates that at certain conditions ablation can initiate prior to fiber formation and lead to the ablation of LINC fibers.

Figure 15:
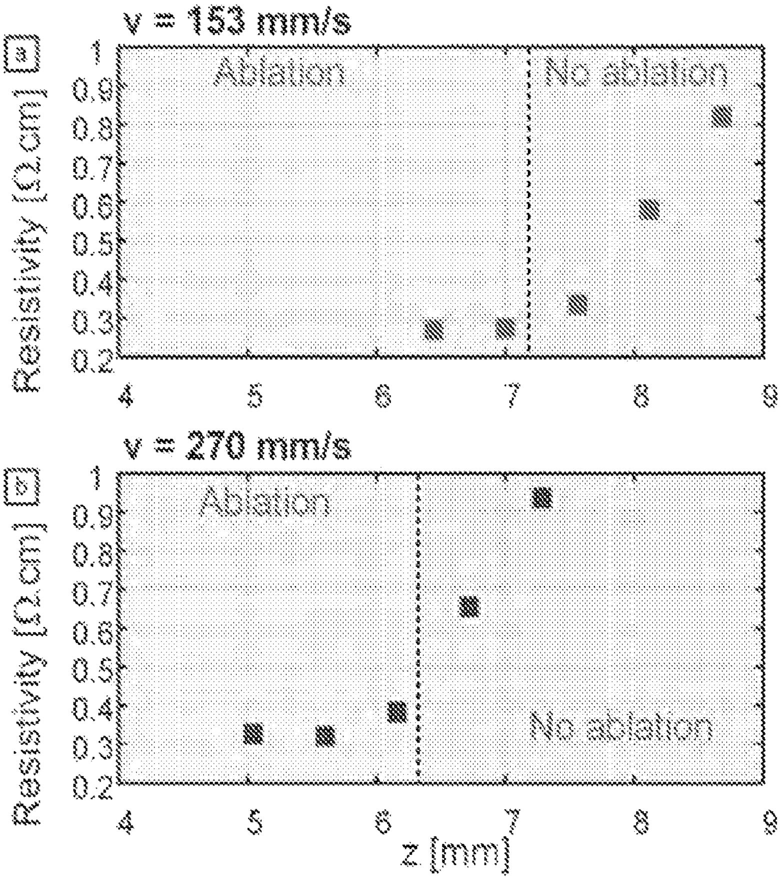
FIG. 15 illustrates plots of experimentally estimated bulk resistivity of flat lased LINC electrodes at difference defocus levels, illustrating the effect of ablation on resistivity at speeds at speeds (a) v=153 mm/s and (b) v=270 mm/s.

To test the effect of T1 and T3 transition on resistivity, LINC electrodes were lased at flat conditions and their resistivity estimated from cross section area data at P=28 W and v=153 mm/s and v=270 mm/s and different defocusing values. The results are shown in FIGS. 15(*a*) and 15(*b*). Optical imaging of the electrodes at different defocus values was also carried out. The T3 transition defocus values match the values resulting from the tilted lasing. Post ablation, a sharp drop in resistivity was observed which tends to stay constant thereafter, with resistivity dropping to 0.27 Ohm·cm at v=153 mm/s and a value of 0.33 Ohm·cm at v=270 mm/s.

From the above analysis and experiments, a number of observations can be made. From the imaging it was observed that no fiber formations at speeds below v=300 nm/s. Additionally, it was observed that T1 is not strongly speed dependent at low speeds, in contrast with T2 which is speed dependent below v=500 mm/s indicating a kinetic influence. A new threshold for ablation of LINC along the lasing path was identified at low speeds starting at v=312 mm/s, revealing a hierarchical porosity with increased ablation. The fluence at ablation conditions is also identified revealing a speed dependence as well. It is clear that speed has a large influence on the LINC process due to the different kinetic conditions at equivalent fluence values. To get more insight into the influence of speed of the actual thermal kinetics, thermal FEM simulations of the tilted lasing were used. As set forth above, polymer lasing is a complex process with laser material interactions, phase and chemical transitions happening at different time scales and are extremely challenging to model accurately. The current model is significantly simplified. However, the model provides useful insight into the process kinetics. An objective of the model is to recreate the lasing conditions used in the experiments and identify the temperatures and temperature rates at points in the simulation corresponding to the locations of the experimentally identified thresholds.

Figure 16:
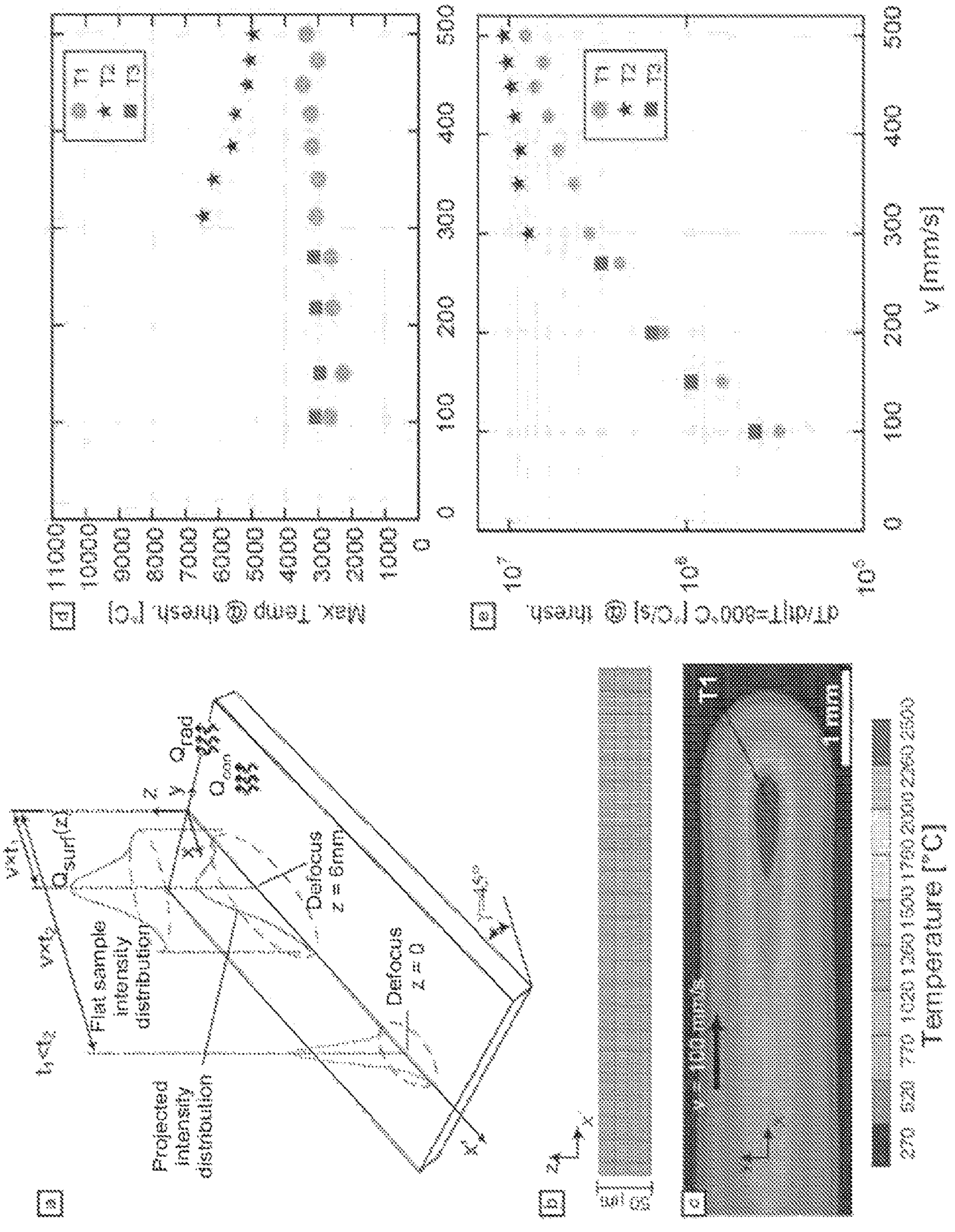
FIG. 16 illustrates: (a) Schematic illustrating the boundary conditions used to simulate tilted lasing. (b) Sample side view of mesh illustrating the sheet thickness. (c) Sample of temperature contours at P=28 W, v=100 mm/s at location T1. (d) Plot illustrating simulation estimated maximum temperatures corresponding to experimentally identified locations T1, T2 and T3 as a function of speed. (e) Plot illustrating simulation estimated temperature increase rates at T=800° C. corresponding to experimentally identified locations T1, T2 and T3 as a function of speed.
Figure 17:
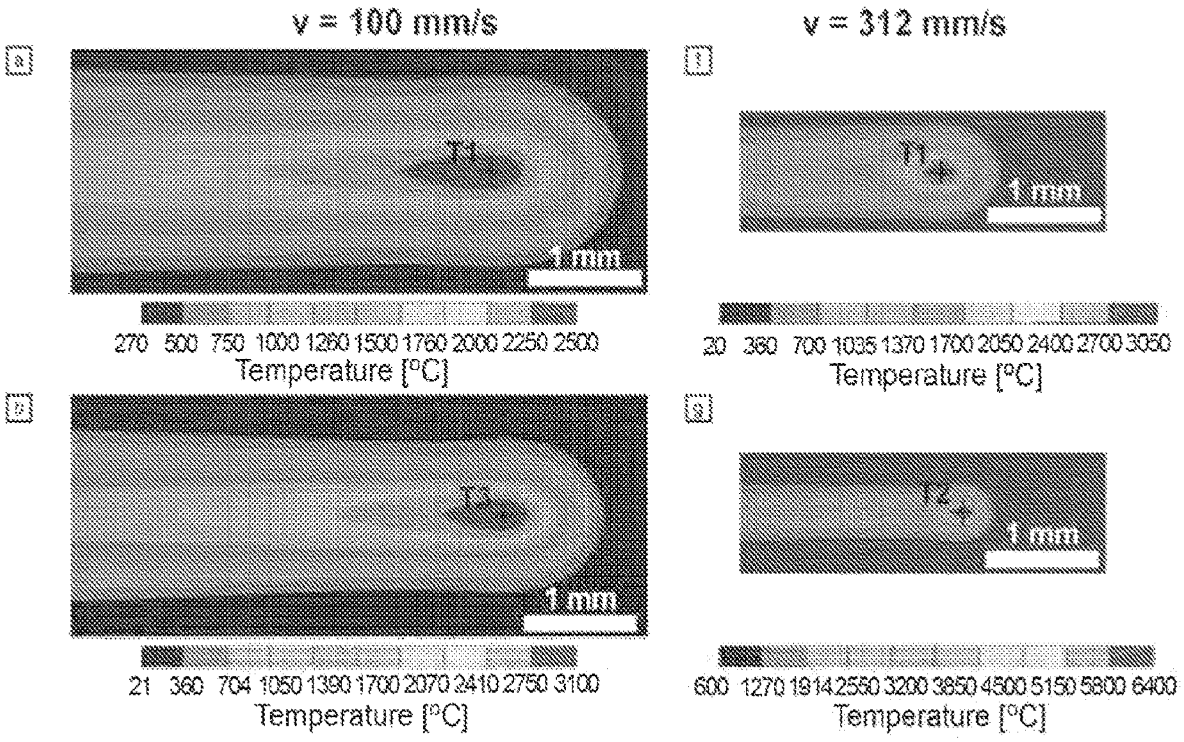
FIG. 17 illustrates a schematic illustrating the process of deriving the maximum temperature and dT/dt|T=800 degC from temperature at a point data at T1, T2 and T3 for two conditions (a-e) v=100 min/s and (f-j) v=312 mm/s with the results for all conditions summarized in (k,l).
Figure 17:
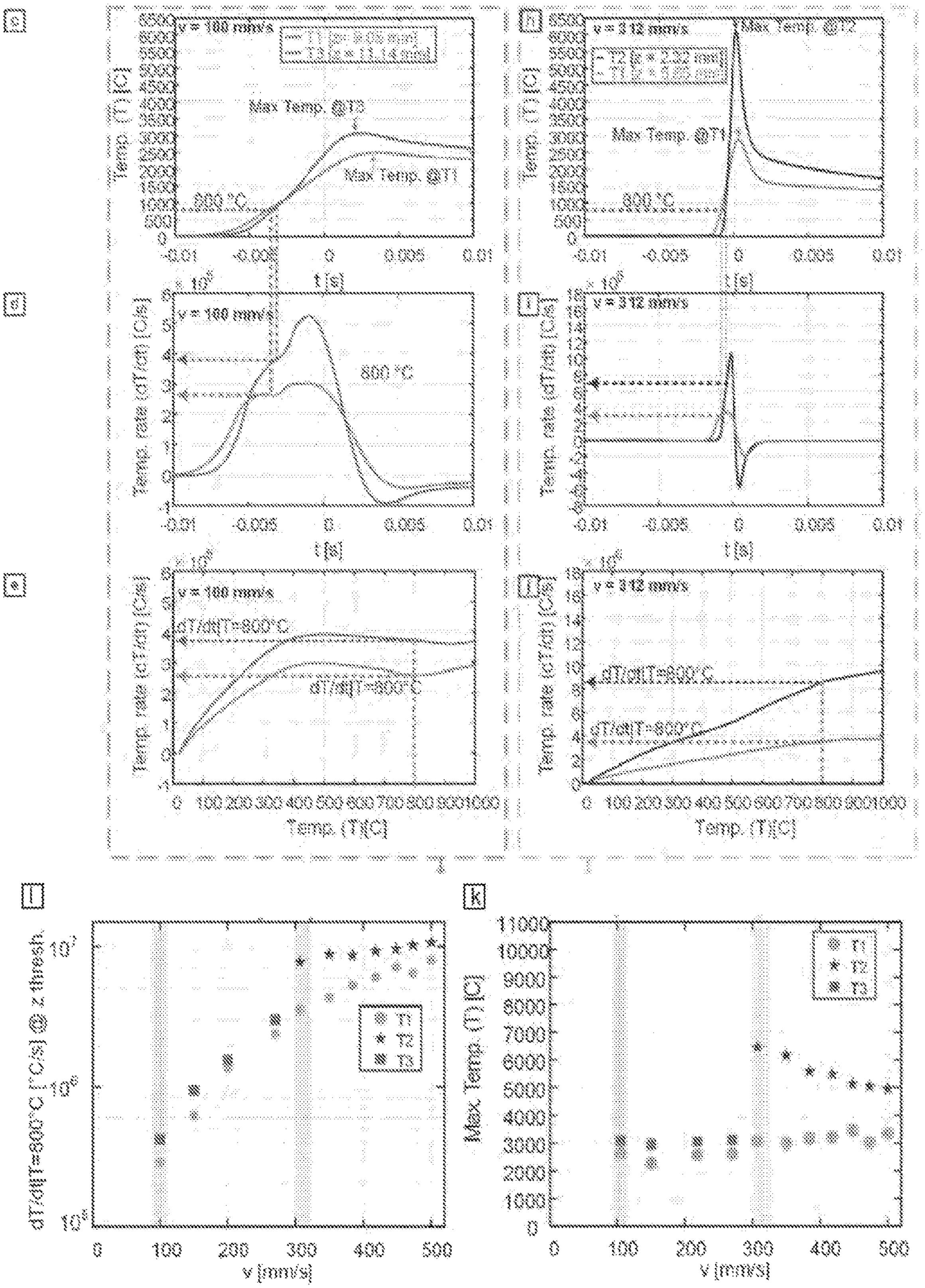
Figure 18:
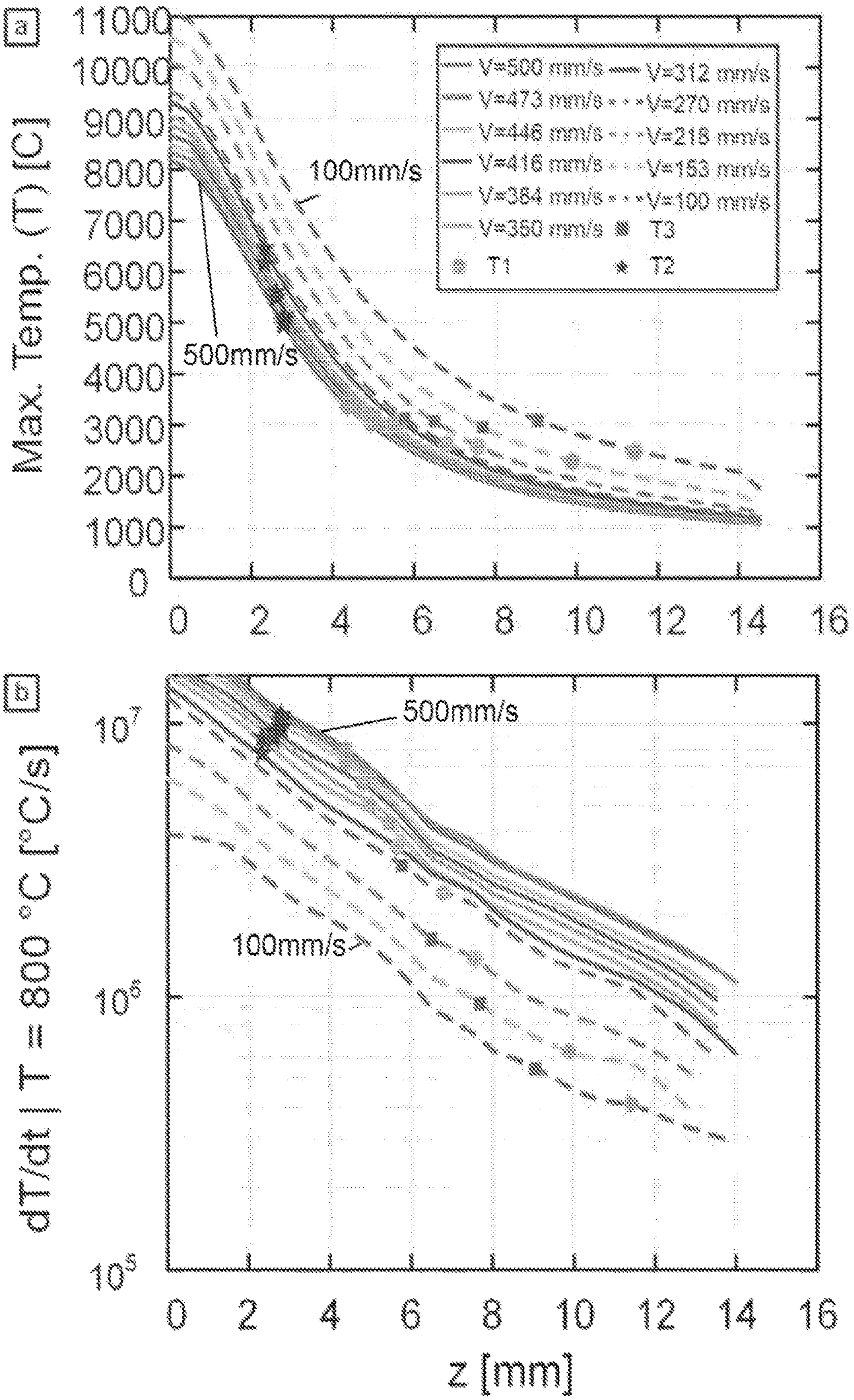
FIG. 18 illustrates: (a) the maximum temperature and (b) temperature rate at different levels of defocus and speedwith the location of the T1, T2 and T3 thresholds marked.

A schematic of the model boundary conditions is shown in FIG. 16(*a*). The beam is modeled as a translating Gaussian heat flux distribution projected along the tilted sample ($\gamma$=45°) with speed v. The Gaussian beam parameters used were derived from the experimental beam characterization. A sample of the mesh showing the meshing across the thickness is additionally shown in FIG. 16(*b*). The material properties were modeled to be temperature dependent to account for phase transition effects. Additionally, the model takes into account radiation and convection effects. Further details of the model are discussed in the Experimental Examples. The simulations were run at conditions corresponding to the experimental conditions (P=28 W, v=100-500 mm/s). For each condition, the temperature and temperature rate at the points corresponding to T1, T2 and T3 were probed with time in the simulation. A sample of the temperature contours is shown in FIG. 16(*c*) at conditions v=100 mm/s and location T1. From these results, the maximum temperature (Tmax) was derived. Additionally, to get a measure for the rate of change of temperature at a point, the time derivative of temperature at T=800° C. was also derived for each threshold point at each speed. This temperature was selected to represent the carbonization temperature of polyimide, which is typically reported to be between 700° C. and 1000° C., The overall approach is summarized in FIGS. 17(*a*) through 17(*l*). The results of this analysis are represented in FIGS. 16(*d*) and 16(*e*) and corresponding figures as a function of defocus and speed are shown in FIGS. 18(*a*) and 18(*b*). FIG. 16(*d*) shows the plot for the maximum temperature at the points corresponding to the T1, T2 and T3 for the different speeds. FIG. 16(*d*) represents the temperature rates at the transitions T1, T2 and T3. From FIG. 16(*d*) it is noted that the maximum temperatures for the T1 transition range between 3400° C. and 3100° C. between v=300 and v=500 mm/s and between 2300° C. and 2500° C. at lower speeds. Overall, the maximum temperature at the threshold T1 shows little speed dependence and occurs at around 3000° C. on average. The T3 transition shows a similar trend where it occurs at slightly higher temperatures than T1 and is between 3000° C. and 3100° C. at speeds lower than 300 nm/s. However, for the T2 transitions, the maximum temperatures start at around 5000° C. at v=500 mm/s and increase to a value of around 6400° C., showing a strong speed dependence. FIG. 16(*e*) shows the corresponding temperature rates at carbonization for the same points. The rates at carbonization range are estimated to span two orders of magnitude between $10^5$ W and $10^{7}$° C./s which agree with reported estimated temperature increase rates of laser heating of polymers. From the results shown in FIGS. 17(*a*) and (*b*), it is noted that in general, higher speeds are reflected with higher temperature rate increase but lower maximum temperatures, illustrating the effect of lasing speed on kinetics. From FIG. 16(*e*), the rates at T1 vary strongly with speed, showing an almost piecewise linear relation when viewed in log scaling, increasing from at 3e5 at v=100 mm/s and 8e6 at v=500 mm/s. The rates at T3 are highly speed dependent, starting at 4e5 at ψ=100 mm/s and 3e6 at v==273 mm/s. The temperature rates at carbonization are less speed dependent for T3, slightly increasing between 0.8e at v=300 mm/s to 1e7 at v=500 mm/s.

The low speed dependence of maximum temperature for T1 (transition from porous to cellular networks) and T3 (Onset of ablation) indicates that these transitions are mainly controlled by temperature and not necessarily by temperature increase rate, implying energetic control at these conditions. To further elaborate on these results, those two transitions were correlated to two particular phenomenon: the graphitization of the polyimide (following carbonization) at T1 and the ablation of the formed graphite/graphene at T3. Previous studies have shown that graphitization of polyimide occurs at a temperature between 2500° C. and 3000° C. This would explain the appearance of the 2D peak at T1, which is associated with the onset of graphitization and the increase in degree of graphitic sheet stacking, and the observed drop in resistivity. This also explains the increased opacity observed under optical imaging. Additionally, ablation studies for graphite usually report that at a temperature of 3300° C. significant ablation is observed, even with CW laser-based heating studies. These temperature values are very close to the temperatures estimated by the simulations, and hence support the conclusions. The ablation is particularly clear at lower speeds due to the longer dwell times by the laser spot and the laser spot heat affected zone. Without limitation to any mechanism, this potentially explains why ablation is not apparent at speeds higher than 300 mm/s.

Alternatively, the results for the T2 transition (from cellular networks to woolly fibers), which show that the T2 transitions mainly occur at a rate around 0.8e7 and 10° C./s, suggest a temperature rate limited process at these conditions and illustrate the influence of kinetics on this transition. The transition to fibers has been suggested to be related to a number of phenomenon associated with the rapid rate of gas released, polyimide backbone bond stability and the mechanical properties of the polyimide.

To understand this transition and how it is different from the other transitions, it is useful to consider the physical phenomenon involved in the process leading to the jetting. Pore nucleation, pore growth due to reaction products, the viscoelastic nature of polyimide and the more brittle nature of graphitic materials. Typically, the phenomenon of jetting is studied and understood in terms of three dimensionless numbers: the Deborah number, Ohnesorge number and Weber number. McKinley, G. R. Visco-Elasto-Capillary Thinning and Break-up of Complex Fluids. *Rheol Rev.* 2005, 3 (05), 1-48, the disclosure of which is incorporated herein by reference. The Deborah number is defined as the ratio of the characteristic relaxation time for a viscoelastic material (which typically decreases with increasing temperature) and the characteristic time scale for a process, which can be the time associated with the material response. Jones, T. J.; Reynolds, C, D.; Boothroyd, S. C. Fluid Dynamic Induced Break-up during Volcanic Eruptions. Nat. Commun. 2019, 10 (1), 3828, https://doi.org/10.1038/s41467-019-11750-4, 1-48, the disclosure of which is incorporated herein by reference. When the Deborah number is low, the material behaves more like a fluid. At a high Deborah number, the material demonstrates a more solid-like behavior, in the case of fiber formation, the response is driven by the rapid temperature increase (due to the shorter dwell times) and hence pressure increase in the pores due to the gases released during the process. At rapid temperature increases and higher gas release pressure, driven by a chemical reaction threshold which is likely governed by polyimide backbone stability, the Deborah number is likely to be very low. This is due to the shorter relaxation time of the polyimide and high pressure increase and release driven by the high temperature rates and short laser dwell times. At the low Deborah number and incomplete carbonization of the polyimide and gas release, the phase transitioning polyimide is likely to jet out, leading to fiber formations. The size and shape of the resulting jetting material are typically governed by the Ohnesorge number and Weber number. The Ohnesorge number represents the ratio between the viscous forces to inertial and surface tension forces. The Weber number represents the ratio between kinetic effects and surface tension effects for a droplet. These numbers, combined with other non-linear effects, decide whether the ejected material will form filaments/fibers or droplets as well as the size of the fibers. It is interesting that the LINC fibers exhibit filamentous shapes and interconnected webs with spherically shapes in between, which has also been observed in nonlinear viscosity jets seen with polymeric flows and sneeze jets. This phenomenon likely don't occur at the earlier transitions due to higher Deborah numbers, low gas release pressures and longer dwell times that graphitize the polyimide before the beam coincides with a point. If the dwell time is long and the heating rates are low, the material is likely to graphitize and lose its viscoelastic properties due to the phase change and hence no jetting would occur. This conclusion is further supported by the Raman spectrum of the nanocarbon fibers which are characterized by the disappearance of the 2D peak, indicating that the nanofibers are incompletely graphitized polyimide that are jetted prior to graphitization. Interestingly, this type of analysis have similarly been used to study jetting and fragmenting non-Newtonian fluids. Examples are the study volcanic magma bubble formation and fiber fragmentation, sneezing, ink jet printing, polymer fluids, some of which at certain conditions, can generate interconnected filaments like the nanofibers observed after the T2 transition in LINC.

Using a unique tilted lasing approach, insight was gained into the fundamentals of the process of laser induced carbonization of polyimide using continuous $CO_2$ lasers. This unique methodology allowed identification the morphological transformations of LINC and correlating them with fluence values. Furthermore, the methodology allowed investigations of the effect of lasing speed, and hence process kinetics, on these morphological transitions. In addition to identifying how the fluence values at morphological transitions are affected by speed, a unique methodology to incorporate the experimental results with thermal simulations was developed to gain more insight on the process and identify whether a transition is energetically driven or kinetically driven. Using the simulation results combined with Raman and XPS analysis, it was determined that the two transitions, the transition from a porous to cellular morphology and the onset of ablation, are likely to reflect two physical phenomenon: the graphitization of polyimide and the ablation of the graphitized polyimide respectively. Those transitions are shown to be temperature dependent and the results agree with experimentally reported temperatures for such phenomenon. The cellular-to-fibrous networks transition was found to be mainly driven by the rate of temperature increase and it is proposed without limitation that it is the result of a decreased Deborah number combined with the rapid release of gas associated with the thermochemical stability of the polyimide. The resulting morphology is the result of the jetting of the incompletely carbonized polyimide, which acts like a non-Newtonian fluid jet which manifests with the formation of filaments and webs of nanocarbons.

EXPERIMENTAL EXAMPLES

LINC formation on polyimide. Polyimide tape (TAPE CASE 2B, Cat. No. 15C616, tape thickness: 88.9 microns) was used as a substrate precursor fir INC formation experiments. To prepare for the experiments, the tape was place on silicon wafers, rinsed with acetone then Isopropyl alcohol for sample surface cleaning.

Direct laser irradiation on the polyuronide sheets was conducted in air using a CC, laser cutter/engraver system (Full Spectrum Laser Pro-Series 20×12, 1.5 inch focus lens) with 10.6 μm wavelength and 45 W power. The system allows tuning the power by controlling the laser current. We measure the laser power at different currents using a $CO_2$ laser power meter (HILP-200, Changchun Laser Optoelectronics Technology Co., Ltd.). The beam radius was measured based on ($1/e^2$) of the maximum intensity ($w_y$, $w_x$) at different distances (z) from the beam waist using the knife-edge method. Bilger, H. R.; Habib, T. Knife-Edge Scanning of an Astigmatic Gaussian Beam. *Appl. Opt.* 1985, 24 (5), 686, the disclosure of which is incorporate herein by reference. Using, this technique, the beam radius at the beam waist ($w_{ox}$, $w_{oy}$), based on a Gaussian beam assumption, was determined to be 125.8 μm in the x-direction and 84 μm in the y-direction.

The laser objective lens is mounted on a motorized XY stage with a maximum speed of 500 mm/s in the X-direction. The beam spot size was controlled by adjusting the vertical distance (z) between the sample position and the beam waist; i.e., by moving the sample stage vertically with respect the objective lens. Laser power (P) was varied from 11.7 W to 30.7 W, and all experiments were performed at X-direction speed (v) of 500 mm/s and under ambient conditions.

In studies of lasing speed, lasing speed (v) was varied from 100 mm/s to 500 mm/s, and all experiments were performed at a power P=28 W and under ambient conditions.

Beam fluence model. The beam is modeled as a non-astigmatic elliptical Gaussian beam. The beam intensity is modeled using the following relationship (as illustrated in FIG. 1(*a*))[59,60]:

$$I(x, y, z) = I_o e^{-2\left(\left(\frac{x}{w_x(z)}\right)^2+\left(\frac{y}{w_y(z)}\right)^2\right)}\left[\frac{W}{m^2}\right]$$

where x and y are measured from beam center axis at distance z from the beam waist. Beam dimensions at defocusing level (z) are $w_x$ and $w_y$ (as illustrated in FIG. 1(*d*)) based on $1/e^2$, and $I_o$ is the maximum intensity.

Beam total power delivered at a spot with z vertical distance from the beam waist (estimated using thermopile measurements) is equal to the integration of the intensity over the laser spot in the horizontal plane (normal to the beam center axis), assuming complete absorption of the laser beam energy:

$$P = I_o \int\int_{-\infty}^{\infty} e^{-2\left(\frac{x}{w_x}\right)^2} e^{-2\left(\frac{y}{w_y}\right)^2} dxdy \approx \frac{\pi}{2} I_o w_x w_y$$

where $w_x$ and $w_y$ are the ($1/e^2$) beam size.

This integration approximately gives the value of the maximum intensity:

$$I_o(z) \approx \frac{2P}{\pi w_x(z) w_y(z)}$$

where P is constant for different z's, however the $w_x$ and $w_y$ change.

The Gaussian beam size at different z values is estimated using the following equations (assuming the beam spot major and minor axis is aligned with the lasing direction x and y):

$$w_x(z) = w_{ox}\sqrt{1+\left(\frac{M_x^2\lambda z}{\pi w_{ox}^2}\right)^2}$$

$$w_y(z) = w_{oy}\sqrt{1+\left(\frac{M_y^2\lambda z}{\pi w_{oy}^2}\right)^2}$$

Where $M_x^2$ and $M^2$ are the beam quality factor for the x and y direction respectively, $w_{ox}$ and $w_{oy}$ are the beam waist dimensions (as illustrated in FIG. 1(*a*)). These parameters are estimated using the knife edge method as described in the supplementary information.

The average flux $I_{av}$ is estimated at a certain spot size for a laser power P, by averaging the intensity I(z) over the spot area A(z):

$$I_{av}(z) = \frac{\int_{-w_x(z)}^{w_x(z)}\int_{w_y(z)}^{w_y(z)} I(x, y, z)dydx}{A(z)} = \frac{I_o}{\pi w_x(z) w_y(z)}\int_{-w_x(z)}^{w_x(z)}\int_{-w_y(z)}^{w_y(z)} e^{-2\left(\frac{x}{w_x(z)}\right)^2} e^{-2\left(\frac{y}{w_y(z)}\right)^2} dxdy$$

The average fluence F is then estimated using the following relationship:

$$f(z, v) = D(z, v) I_{av}(z)$$

where D(z,v) is the dwell time of the laser beam over a spot. The dwell time is estimated by dividing the beam length in the lasing direction x by the beam speed v.

$$D(z, v) = \frac{2w_x(z)}{v}$$

The average fluence of the beam on a tilted surface is shown to be approximately equal to the untilted surface average fluence for our ranges of the tilting angle ψ.

The influence of speed on dwell time is shown in FIG. 9(*f*). The average fluence of the beam on a tilted surface was shown to be approximately equal to the untilted surface average fluence for our ranges of the tilting angle γ.

2D Distribution of fluence model. The laser beam flux (l) is expressed at a point (x, y) at the laser beam focus and time (t) using scanning in the x-direction with speed (v) according to the following expression:

$$I(x, y, t) = \frac{2P}{\pi w_{ox} w_{oy}} e^{-\left(\frac{2(x-(L_x-vt))^2}{w_{ox}^2} + \frac{2y^2}{w_{oy}^2}\right)}$$

where P is the laser beam power, $w_{ox}$ and $w_{oy}$ is the beam waist size, v is the beam velocity and $L_x$ is the lasing length in the x-direction.

To estimate the fluence at a point, the x and y-values are fixed at a point ($x_o$, $y_o$) and the flux is integrated over time using the following expression:

$$F(t) = \int_0^\infty I(x_o, y_o, t)dt$$

If this value is estimated at different y-values perpendicular to the laser path, the fluence (F) delivered across the sample can be estimated due to a single laser path.

Characterization of LINC. SEM images of the LINC formations were taken on a Zeiss SIGMA VP Field emission scanning electron microscope. The samples were sputter coated with platinum and then imaged with a beam with an accelerating voltage of 2 kV, A XplorA Raman-AFM/TERS system microscope using 473-nm laser excitation at room temperature with a laser power of 25 mW was employed to obtain. Raman spectra. XRD was conducted on a Bruker D8 Discover SRI) X-ray diffractometer with Cu Kα radiation (A=1.54 Å). The LINC samples for XRD, were scratched from LINC lines. XPS analysis was performed using a Thermo Fisher ESCALAB 250 Xi XPS at a base pressure of 5e-9 Torr. All of the survey spectra were recorded in 1 eV step size. Elemental core spectra were recorded in 0.1 eV step sizes. All the spectra were corrected using C1s peaks (284.5 eV) as references. The resistance of the LINC lines were measured using a Keithley two-point probe meter (model: 2100, detection limit: 100 MO), LINC lines of lengths 15 mm are lased in the polyimide at different z values. Each value of z and power is replicated three times. A nickel paste (PELCO® Conductive Nickel Paint) was applied to the UNC lines at the measurement spots area for better contact with the probe terminals. The resistance at different lengths of LINC are measured and averaged from the three replications and used to estimate the R/L values for the LINC lines.

In variable speed studies, the resistivity of LINC are measured and averaged and the cross-sectional area is measured to estimate bulk resistivity. To identify the edge of onset of ablation, the local graph cut method in the image segmenter tool in MATLAB® was used.

Simulation of laser heating using ANSYS APDL. The laser heating of polyimide films was simulated in ANSYS APDL. In the simulations, the properties of polyimide were assumed to be temperature dependent to incorporate the influence of carbonization and graphitization. The model geometry of polyimide were defined as (thickness: 50 um, width: 1 mm, Length: 20 mm). Further details are presented in the supporting information.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of producing a carbonized material, comprising:

applying a beam of electromagnetic radiation from a laser source to a polymeric substrate, varying the position of the beam to traverse over at least a portion of a surface of the polymeric substrate in a predetermined pattern to produce a carbonized material, and controlling (i) a fluence of the beam traversing over the at least a portion of the surface of the polymeric substrate to one or more predefined levels of fluence as a function of position on the surface, and (ii) a speed of movement of the beam traversing over the at least a portion of the surface of the polymeric substrate to one or more predefined levels of speed of movement as a function of position on the surface, wherein the fluence of the beam and the speed of movement of the beam are controlled to control at least one property of the carbonized material in producing the carbonized material, and wherein at least one of the fluence of the beam and the speed of movement of the beam is controlled to two or more predefined levels to achieve one or more predetermined smooth transitions in the at least one property of the carbonized material at one or more predetermined positions on the surface of the polymeric substrate along a path of lasing.

2. The method of claim 1 wherein the one or more predetermined smooth transitions in the at least one property of the carbonized material includes at least one of a transition in chemical composition, a transition to $sp^2$-hybridized graphitic carbon, or a transition in morphology.

3. The method of claim 2 wherein the transition in chemical composition comprises a transition in heteroatom content.

4. The method of claim 1 wherein the one or more predetermined smooth transitions in the at least one property of the carbonized material comprises a transition to $sp^2$-hybridized graphitic carbon.

5. The method of claim 1 wherein the produced carbonized material includes nanostructured graphene domains.

6. The method of claim 1 wherein the fluence of the beam is controlled to the two or more predefined levels by controlling a distance between a focus or waist of the beam and the surface of the polymeric substrate, by controlling optics of the laser source or by controlling power of the laser source.

7. The method of claim 6 wherein the fluence of the beam is controlled to the two or more predefined levels by controlling a distance between a focus or waist of the beam and the surface of the polymeric substrate.

8. The method of claim 7 wherein the distance between a focus or waist of the beam and the surface of the polymeric substrate is controlled by a variation in surface conformation of the polymeric substrate, by dynamically changing the position of the laser source during lasing, or by dynamically changing the position of the polymeric substrate during lasing.

9. The method of claim 1 wherein at least one of fluence of the beam or the speed of movement of the beam is varied over the at least a portion of the surface of the polymeric substrate.

10. The method of claim 1 wherein at least one of fluence of the beam or the speed of movement of the beam is held constant over the at least a portion of the surface of the polymeric substrate.

11. The method of claim 1 wherein the one or more predetermined smooth transitions in the at least one property of the carbonized material includes a one or more transitions in morphology.

12. The method of claim 11 wherein there are a plurality of levels of fluence for a given speed of movement of the beam associated with the one or more predetermined smooth transitions, the plurality of levels of fluence comprising a lower threshold level of fluence corresponding to a transition from an isotropic porous morphology to an anisotropic cellular network and a higher threshold level of fluence corresponding to (i) a transition from an anisotropic cellular network to aligned nanofibers or (ii) to a transition from an anisotropic cellular network to a porous ablated morphology.

13. The method of claim 12 wherein the fluence of the beam is controlled to be between the lower threshold level of fluence and the higher threshold level of fluence to provide electrical conductivity over at least a section of the portion of the surface of the polymeric substrate.

14. The method of claim 1 further comprising creating a model of the at least one property of the produced carbonized material as a function of at least one of the speed of movement of the beam, the fluence of the beam, and a variable upon which the fluence of the beam is dependent.

15. The method of claim 14 wherein the model of the at least one property is also determined as a function of beam focus and power input to the laser source.

16. The method of claim 1 wherein the one or more predetermined smooth transitions in the at least one property of the carbonized material are predetermined by traversing the laser source in a path over at least one test polymeric substrate of the same polymeric material as the polymeric substrate, wherein the at least one test polymeric substrate is inclined in orientation relative to the path of the laser source to create a continuous variation in fluence over the path of the laser source.

17. The method of claim 15 wherein one or more predetermined smooth transitions in the at least one property of the carbonized material are predetermined by traversing the laser source in a path over at least one test polymeric substrate of the same polymeric material as the polymeric substrate, wherein the at least one test polymeric substrate is inclined in orientation relative to the path of the laser source to create a continuous variation in fluence over the path of the laser source.

18. A method of producing a carbonized material, comprising:

applying a beam of electromagnetic radiation from a laser source to a polymeric substrate, varying the position of the beam to traverse over at least a portion of a surface of the polymeric substrate in a predetermined pattern to produce a carbonized material, controlling (i) a fluence of the beam traversing over the at least a portion of the surface of the polymeric substrate to one or more predefined levels of fluence as a function of position on the surface of the polymeric substrate, and (ii) a speed of movement of the beam traversing over the at least a portion of the surface of the polymeric substrate as a function of position on the surface to two or more predefined levels of speed of movement of the beam, wherein the fluence of the beam and the speed of movement of the beam are controlled to control at least one property of the carbonized material in producing the carbonized material, wherein the fluence of the beam and speed of movement of the beam are controlled to achieve one or more predetermined transitions in the at least one property of the carbonized material at one or more predetermined positions on the surface of the polymeric substrate along a path of lasing, the one or more predetermined transitions in the at least one property of the carbonized material comprising one or more transitions in morphology, wherein there are a plurality of levels of fluence for a given speed of movement of the beam associated with the one or more predetermined transitions, the plurality of levels of fluence comprising a lower threshold level of fluence corresponding to a transition from an isotropic porous morphology to an anisotropic cellular network and a higher threshold level of fluence corresponding to (i) a transition from an anisotropic cellular network to aligned nanofibers or (ii) to a transition from an anisotropic cellular network to a porous ablated morphology, and wherein the fluence of the beam is controlled to be between the lower threshold level of fluence and the higher threshold level of fluence to provide electrical conductivity over at least a section of the portion of the surface of the polymeric substrate.

19. A method of producing a carbonized material, comprising:

applying a beam of electromagnetic radiation from a laser source to a polymeric substrate, varying the position of the beam to traverse over at least a portion of a surface of the polymeric substrate in a predetermined pattern to produce a carbonized material, controlling a fluence of the beam traversing over the at least a portion of the surface of the polymeric substrate to two or more predefined levels of fluence as a function of position on the surface of the polymeric substrate by controlling a distance between a focus or waist of the beam and the surface of the polymeric substrate, and controlling a speed of movement of the beam traversing over the at least a portion of the surface of the polymeric substrate as a function of position on the surface to one or more predefined levels of speed of movement of the beam, wherein the fluence and the speed of movement are controlled to control at least one property in producing the carbonized material, wherein the fluence of the beam and speed of movement of the beam are controlled to achieve one or more predetermined transitions in the at least one property of the carbonized material at one or more predetermined positions on the surface of the polymeric substrate along a path of lasing.

20. The method of claim 19 wherein the distance between a focus or waist of the beam and the surface of the polymeric substrate is controlled by a variation in surface conformation of the polymeric substrate, by dynamically changing the position of the laser source during lasing, or by dynamically changing the position of the polymeric substrate during lasing.

21. A method of producing a carbonized material, comprising:

applying a beam of electromagnetic radiation from a laser source to a polymeric substrate, varying the position of the beam to traverse over at least a portion of a surface of the polymeric substrate in a predetermined pattern to produce a carbonized material, controlling (i) a fluence of the beam traversing over the at least a portion of the surface of the polymeric substrate to one or more predefined levels of fluence as a function of position on the surface of the polymeric substrate, and (ii) a speed of movement of the beam traversing over the at least a portion of the surface of the polymeric substrate as a function of position on the surface to two or more predefined levels of speed of movement of the beam, wherein the fluence and the speed of movement are controlled to control at least one property of the carbonized material in producing the carbonized material, wherein the fluence of the beam and speed of movement of the beam are controlled to achieve one or more predetermined transitions in the at least one property of the carbonized material at one or more predetermined positions on the surface of the polymeric substrate along a path of lasing, wherein the one or more predetermined transitions in the at least one property of the carbonized material are predetermined by traversing the laser source in a path over at least one test polymeric substrate of the same polymeric material as the polymeric substrate, and wherein the at least one test polymeric substrate is inclined in orientation relative to the path of the laser source to create a continuous variation in fluence over the path of the laser source.

22. The method of claim 21 further comprising creating a model of the at least one property of the produced carbonized material as a function of at least one of the speed of movement of the beam, the fluence of the beam, and a variable upon which the fluence of the beam is dependent.

23. The method of claim 22 wherein the model of the at least one property is also determined as a function of beam focus and power input to the laser source.

* * * * *